United States Patent
Ahad

(10) Patent No.: US 10,853,161 B2
(45) Date of Patent: *Dec. 1, 2020

(54) AUTOMATIC ANOMALY DETECTION AND RESOLUTION SYSTEM

(71) Applicant: Oracle International Corporation, Redwood Shores, CA (US)

(72) Inventor: Rafiul Ahad, Fremont, CA (US)

(73) Assignee: Oracle International Corporation

( * ) Notice: Subject to any disclaimer, the term of this patent is extended or adjusted under 35 U.S.C. 154(b) by 197 days.

This patent is subject to a terminal disclaimer.

(21) Appl. No.: 16/050,429

(22) Filed: Jul. 31, 2018

(65) Prior Publication Data

US 2019/0042353 A1 Feb. 7, 2019

Related U.S. Application Data

(63) Continuation of application No. 15/165,298, filed on May 26, 2016, now Pat. No. 10,042,697.

(Continued)

(51) Int. Cl.
*G06F 11/00* (2006.01)
*G06F 11/07* (2006.01)
(Continued)

(52) U.S. Cl.
CPC ...... *G06F 11/0793* (2013.01); *G06F 11/0709* (2013.01); *G06F 11/079* (2013.01);
(Continued)

(58) Field of Classification Search
CPC ............. G06F 11/0793; G06F 11/0709; G06F 11/0751; G06F 11/079; G06F 11/301;
(Continued)

(56) References Cited

U.S. PATENT DOCUMENTS 10,042,697 B2 * 8/2018 Ahad ................. G06F 11/0709
2004/0205101 A1 10/2004 Radhakrishnan
(Continued)

FOREIGN PATENT DOCUMENTS

CN 103797468 5/2014
CN 104410535 3/2015
(Continued)

OTHER PUBLICATIONS

Japanese Application No. JP2017-561705, "Office Action", dated Mar. 17, 2020, 3 pages.
(Continued)

*Primary Examiner* — Joseph D Manoskey
(74) *Attorney, Agent, or Firm* — Kilpatrick Townsend & Stockton LLP

(57) ABSTRACT

An anomaly detection and resolution system (ADRS) is disclosed for automatically detecting and resolving anomalies in computing environments. The ADRS may be implemented using an anomaly classification system defining different types of anomalies (e.g., a defined anomaly and an undefined anomaly). A defined anomaly may be based on bounds (fixed or seasonal) on any metric to be monitored. An anomaly detection and resolution component (ADRC) may be implemented in each component defining a service in a computing system. An ADRC may be configured to detect and attempt to resolve an anomaly locally. If the anomaly event for an anomaly can be resolved in the component, the ADRC may communicate the anomaly event to an ADRC of a parent component, if one exists. Each ADRC in a component may be configured to locally handle specific types of anomalies to reduce communication time and resource usage for resolving anomalies.

20 Claims, 18 Drawing Sheets

Related U.S. Application Data

(60) Provisional application No. 62/167,851, filed on May 28, 2015, provisional application No. 62/199,895, filed on Jul. 31, 2015, provisional application No. 62/245,706, filed on Oct. 23, 2015.

(51) Int. Cl.
*H04L 12/24* (2006.01)
*H04L 29/08* (2006.01)
*G06F 11/34* (2006.01)
*G06F 11/30* (2006.01)

(52) U.S. Cl.
CPC ........ *G06F 11/0751* (2013.01); *G06F 11/301* (2013.01); *G06F 11/3048* (2013.01); *G06F 11/3072* (2013.01); *G06F 11/3409* (2013.01); *G06F 11/3495* (2013.01); *H04L 41/5003* (2013.01); *H04L 41/5038* (2013.01); *H04L 67/02* (2013.01)

(58) Field of Classification Search
CPC ............. G06F 11/3048; G06F 11/3072; G06F 11/3409; G06F 11/3495; H04L 41/5003; H04L 41/5038; H04L 67/02
See application file for complete search history.

(56) References Cited

U.S. PATENT DOCUMENTS

| | | | |
|---|---|---|---|
| 2011/0098973 | A1 | 4/2011 | Seidman |
| 2012/0130874 | A1 | 5/2012 | Mane et al. |
| 2015/0081880 | A1 | 3/2015 | Eaton et al. |
| 2016/0300142 | A1 | 10/2016 | Feller et al. |
| 2016/0350173 | A1 | 12/2016 | Ahad |

FOREIGN PATENT DOCUMENTS

| | | |
|---|---|---|
| CN | 104520806 | 4/2015 |
| CN | 107690623 A | 2/2018 |
| CN | 107690623 | 6/2019 |
| EP | 1482404 | 12/2004 |
| EP | 3304315 | 4/2019 |
| JP | 2000322274 | 11/2000 |
| JP | 2005346331 | 12/2005 |
| WO | 2010103562 A1 | 9/2010 |
| WO | 2013043170 A1 | 3/2013 |
| WO | 2016191639 A1 | 12/2016 |

OTHER PUBLICATIONS

U.S. Appl. No. 15/165,298, Corrected Notice of Allowance dated Apr. 2, 2018, 4 pages.
U.S. Appl. No. 15/165,298, Corrected Notice of Allowance dated Feb. 13, 2018, 5 pages.
U.S. Appl. No. 15/165,298, First Action Interview Pilot Program Pre-Interview Communication dated Oct. 19, 2017, 4 pages.
U.S. Appl. No. 15/165,298, Notice of Allowance dated Jan. 16, 2018, 19 pages.
Ahad et al., "Towards Autonomic Cloud: Automatic Anomaly Detection and Resolution", 2015 published by the IEEE Computer Society in Cloud and Autonomic Computing, International Conference on Cloud and Autonomic Computing (ICCAC), Sep. 21-25, 2015, pp. 200-203.
Ahad et al., "Towards Autonomic Cloud Automatic Anomaly Detection and Resolution", Oracle Corporation, presentation at IEEE International Conference on Cloud and Autonomic Computing (ICCAC), Sep. 23, 2015, 22 pages (not all slides were shown).
Ahad, et al., Transcript and associated screen shots for YouTube video for "Two-Tier Adaptive Heap Management for Oracle WebLogic Server on the Oracle JRockit JVM, JavaOne", published Jun. 8, 2013, 25 pages, (link: https://www.Youtube.com/watch?v=eaQsKYJB5xQ) (total length of portion of video presented: 05:38 minutes).
Buyya et al., "Autonomic Cloud Computing: Open Challenges and Architectural Elements", Third International Conference on Emerging Applications of Information Technology (EAIT), 2012, 8 pages.
Da Silva Bezerra et al., "A Policy-Based Autonomic Model Suitable for Quality of Service Management", Journal of Networks, vol. 4, No. 4, Aug. 2009, pp. 495-504.
Fu , "Performance Metric Selection for Autonomic Anomaly Detection on Cloud Computing Systems", IEEE Globecom, 2011, 5 pages.
Gupta et al., "Outlier Detection for Temporal Data: A Survey", IEEE Transactions on Knowledge and Data Engineering, vol. 26, No. 9, Sep. 2014, pp. 2250-2267.
Kephart et al., "The Vision of Autonomic Computing", IBM Research, IEEE Computer Society, Oct. 2001, 10 pages.
Oracle Corporation , "Cloud Control Administrator's Guide", Oracle® Enterprise Manage, E24473-45, Feb. 2016, 950 pages.
Oracle Corporation , "Configuring and Using the Diagnostic Framework for Oracle WebLogic Server", Oracle® Fusion Middleware, 11g Release 1 (10.3.5), E13714-04, Apr. 2011, 210 pages.
International Application No. PCT/US2016/034536, International Preliminary Report on Patentability dated Jun. 21, 2017, 7 pages.
International Application No. PCT/US2016/034536, International Search Report and Written Opinion dated Aug. 26, 2016, 13 pages.
Smith et al., "An Anomaly Detection Framework for Autonomic Management of Compute Cloud Systems", 34th Annual IEEE Computer Software and Applications Conference Workshops, 2010, pp. 376-381.
Tchana et al., "Autonomic resource allocation in a J2EE cluster", IRIT/ENSEEIHT. JTE, Jun. 17-18, 2010, 8 pages.
Xu et al., "Detecting Large-Scale System Problems by Mining Console Logs", Proceedings of the ACM SIGOPS, 2009, 16 pages.
Chinese Application No. 201680030877.2, Office Action dated Nov. 26, 2018, 10 pages.
Japanese Application No. JP2017-561705, "Office Action", dated Dec. 10, 2019, 6 pages.

* cited by examiner

AUTOMATIC ANOMALY DETECTION AND RESOLUTION SYSTEM

CROSS-REFERENCES TO RELATED APPLICATIONS

This application is a continuation of, and claims the benefit and priority of U.S. patent application Ser. No. 15/165,298, filed on May 26, 2016, entitled "Automatic Anomaly Detection and Resolution System," which claims the benefit and priority under 35 U.S.C. 119(e) of each of the following applications:
1) U.S. Provisional Application No. 62/167,851, filed May 28, 2015, entitled "Automatic Anomaly Detection and Resolution";
2) U.S. Provisional Application No. 62/199,895, filed Jul. 31, 2015, entitled "Automatic Anomaly Detection and Resolution"; and
3) U.S. Provisional Application No. 62/245,706, filed Oct. 23, 2015, entitled "Automatic Anomaly Detection and Resolution."

The contents of each of the patent applications identified above are part of this disclosure and are herein incorporated by reference in their entirety for all purposes.

BACKGROUND

Cloud computing is a model for enabling convenient, on-demand network access to a shared pool of configurable computing resources (e.g., networks, servers, storage, applications, and services). The services provided or accessed through cloud computing, such as via a network, can be referred to as cloud services. There is a lot of processing that needs to be performed by a cloud service provider to make cloud services available to a subscribing customer. Due to its complexity, much of this processing is still done manually. For example, provisioning resources for providing such cloud services can be a very labor intensive process.

Data centers supporting cloud computing systems tend to be very large in size, comprising thousands of compute and storage servers and hundreds of network and other devices. For example, recent statistics suggest that there are 80,000 or more virtual machines with 540 PB or more storage utilized for cloud computing systems provided globally by Oracle Corporation. There are at least 19 Tier 4 data centers 62 million or more active users resulting 30 billion or more transaction daily. Manual administration of the cloud data centers, even using command tools such as MCollective or Chef and monitoring tools such Graphite, can increase the cost of cloud services and can reduce the quality of services. Such tools may not react to and correct potential anomalies in system behavior, such as those affecting service level agreement (SLAs) and security breaches in a timely manner.

Some cloud computing system providers have implemented system to diagnose and correct problems detected in their cloud computing systems; however, the details as to how such systems are configured to detect problems have not been defined for the entire cloud computing system. Some have implemented machine learning algorithms to assess log files and/or developed training data to establish what is normal systems behavior. The log files and/or the data may be compared to normal patterns and any significant deviation is reported as anomaly. Multi-variate analysis techniques (e.g., MSET) can compare multiple log files at the same time. Inferring normal behavior from the log files alone via unsupervised machine learning techniques can be prone to errors. Computing issues identified solely on log files without regard to the system topology, processing flows, or log relationships can introduce a lot of noise as irrelevant combinations of log files may be analyzed that may adversely affect the diagnosis of issues. The possible errors detected and reported by such systems are so broad that it is not amenable to programmatic corrective action. Human beings may need to be involved to address the problems.

Anomalies in a cloud computing system or an enterprise computing system can be caused by many factors including load spikes, component failures, and/or malicious use of the system and they are manifested in increased resource usage, deteriorating key performance indicators (KPI), and spikes in errors in one or more containers. As a result of the challenges described above, quality of service (QoS) guarantees for service-level agreements (SLA) may often not be met. Any given time, millions of hardware and software components can fail at any given time in a cloud computing system and enterprise computing systems. User and operators alike can contribute to human errors and unexpected loads that cause anomalies. Malicious users can lead to outages affecting millions of users. These circumstances can lead to unsatisfactory QoS, resulting in violation of SLAs for cloud computing environments.

To deal with anomalies, some have attempted to monitor anomalies in near real time. These approaches involve collecting the state (metrics, logs, etc.) of the environment in a centralized storage and programmatically analyzing the state for anomalies. Collection of the state of the environment may incur latency due to communication and aggregation of such data. The analysis involves additional time and the result has to be communicated to the operations staff for manual correction of the anomaly following guidelines and scripts. Such corrective action may result in long latencies between the time the anomaly occurred and the time corrective action is taken. Collection and analysis of all log entries and metrics may be an inefficient use of resources, as most data in the log files correspond to normal conditions. The data may provide low signal-to-noise ratio since anomalies is the signal to be identified. Further, because anomalies relate to infrequently occurring cases, such as crashes, deadlocks, long response times, etc., analysis of data for normal conditions may provide minimal value. Fine-grain detection of anomalies are sought to identify precursor events to avoid conditions resulting in violation of SLAs in the first place.

BRIEF SUMMARY OF THE INVENTION

In certain embodiments, techniques are disclosed for an anomaly detection and resolution system (ADRS) to automatically detect and resolve anomalies in computing environments (e.g., cloud computing systems and enterprise computing systems). These techniques enable automatic detection and resolution of anomalies to minimize, if not avoid, service level agreement (SLA) violations for services provided in a computing system. Anomaly detection and resolution is concerned with maximizing the SLA compliant period at the lowest cost possible cost. Techniques disclosed herein can reduce, if not eliminate, human involvement in addressing the size and complexity of large computing systems (e.g., cloud systems), and thus, lead to autonomic computing systems.

The ADRS can automatically detect and correct anomalies, such as response time anomalies, load anomalies, resource usage anomalies, component failures, and outages, all of which can affect quality of service (QoS) for operation in a computing system. The ADRS may be implemented using an anomaly classification system defined by different categories (subtypes) of anomalies such as a defined anomaly and an undefined anomaly. A defined anomaly may be defined by two sub categories, such as user-defined anomaly and system-inferred anomaly. Defined anomaly may be based on bounds on any metric that needs to be monitored, the bounds being either fixed or seasonal. Fixed bounds are invariants for monitoring and enforcing QoS guarantees associated with SLAs. Typically, application administrators or system administrators will define fixed bounds for user-defined anomalies. System administrators may also define additional metrics to monitor resource usage, load spikes, malicious use, and component failures to avert SLA violations, but their bounds are seasonal, to be computed from historical data combined with the trends of the metrics associated with the user-defined anomalies. This type of anomaly is called system-inferred anomaly and its bounds are usually seasonal. Undefined anomalies are anomalies (usually outliers) that are discovered via machine learning and other statistical methods.

The ADRS can take corrective actions based on one or more rules defined in a policy for anomalies. ADRS may be implemented with one or more anomaly detection and resolution components (ADRCs). Each ADRC may be a module or a subsystem. An ADRC may be implemented in each component of the components defining a service or operations performed by a computing system. Each ADRC may be configured to detect and attempt to resolve an anomaly locally in the component. For example, upon detecting an anomaly (e.g., a defined anomaly) in a component, such as a container where a service is running, the ADRC can determine whether it can resolve the anomaly. Each ADRC may be implemented with component-specific resolution policies for managing anomalies detected in the component. If the anomaly event for an anomaly can be resolved by an anomaly resolution policy defined in the component, the ADRC can attempt to resolve the anomaly event based on the policy. Upon determining that the ADRC cannot resolve the anomaly event, either because no policy is defined or the anomaly event could not be resolved based on the policy, the component may communicate the anomaly event to a parent component of the component, if one exists. The anomaly event may be communicated up to each successive parent component of the current component if one exists, until a parent component can resolve the anomaly event. Upon determining that a component has no parent component (e.g., a physical machine has no parent) then the anomaly event is published to a messaging system for an ADRC at an environment level of the computing system to handle the anomaly event. In some embodiments, the anomaly event may be communicated as an alert to users. This hierarchical approach to anomaly resolution is more nimble and is efficient in terms of resource usage compared to centralized anomaly management. Specifically, each ADRC in a component may be configured to locally handle specific types of anomalies, such that communication time and resource usage can be reduced by utilizing resources in the component where an anomaly can be resolved.

In some embodiments, a computer system may be implemented for anomaly detection and resolution. The computer system may be part of an anomaly detection and resolution system. The computer system may be implemented in a cloud computer system (e.g., a cloud infrastructure system) or an enterprise computer system. The computer system may be configured to implement methods and operations described herein. The computer system may include one or more processors and a memory accessible to the one or more processors, the memory storing instructions which, upon execution by the one or more processors, cause the one or more processors to perform one or more methods or operations described herein. Yet other embodiments relate to systems and machine-readable tangible storage media, which employ or store instructions for methods and operations described herein.

In at least one embodiment, a method includes determining a set of values defining an anomaly bound for a metric related to a service provided by a cloud computer system. The service may be established by components in the cloud computer system. The components may include a first container and a second container executing in the cloud computer environment. The first container may be a child container in the second container. The method may include configuring the first container to include an anomaly detection and resolution component (ADRC). The method may include detecting, by the ADRC, in the first container, an anomaly event of an anomaly related to operation of the service in the cloud computer system. The anomaly event may be detected based on a value of the metric not satisfying the anomaly bound for the metric. The method may include identifying a policy for resolving the anomaly in the first container. The method may include determining that a rule in the policy is satisfied by the anomaly. The method may include initiating a corrective action to resolve the anomaly. The corrective action may be identified in the policy based on the rule being satisfied.

In some embodiments, the anomaly bound is a fixed bound defined for a user-defined anomaly. The set of values may include a polling interval value, a minimum measure of the metric, a soft limit for the metric, a maximum for the metric, and a minimum consecutive readings value defining a minimum number of occurrences of the anomaly. Detecting the anomaly event may include determining whether the value of the metric satisfies the anomaly bound. The value of the metric may not satisfy the anomaly bound when the value is less than the minimum measure and equal to or greater than the soft limit. The anomaly event may be detected based on the minimum consecutive readings being satisfied.

In some embodiments, the anomaly bound is a seasonal bound defined for a user-defined anomaly. The set of values may include a polling interval value, a minimum measure of the metric, a soft limit for the metric, a maximum for the metric, a duration of consecutive occurrences of the anomaly, a start time when the seasonal bound is valid, and an end time when the seasonal bound is valid. Detecting the anomaly event may include determining whether the value of the metric satisfies the anomaly bound. The value of the metric may not satisfy the anomaly bound when the value is less than the minimum measure and equal to or greater than the soft limit, when the anomaly event is detected for the duration and is detected after the start time and before the end time.

In at least one embodiment, determining the set of values includes analyzing time series data of log files to compute the set of values for the anomaly bound.

In some embodiments, the method may include upon determining that a policy for resolving the anomaly in the first container cannot be identified, notifying, the second container, that the anomaly cannot be resolved in the first container. The method may include identifying a policy for resolving the anomaly in the second container. The method may include determining that a rule, in the policy for resolving the anomaly in the second container, is satisfied by the anomaly. The method may include, based on the rule being satisfied, initiating a corrective action identified in the policy for resolving the anomaly in the second container.

In at least one embodiment, the metric related to the service is one of a plurality of metrics monitored for quality of service (QoS) for providing the service.

In at least one embodiment, a method may include determining a set of values defining an anomaly bound for a metric related to a service provided by a cloud computer system. The service may be established by components in the cloud computer system. The components may include a first container and a second container executing in the cloud computer environment. The first container may be a child container in the second container. The method may include configuring the first container to include a first anomaly detection and resolution component (ADRC). The method may include configuring the second container to include a second ADRC. The method may include detecting, by the first ADRC, in the first container, an anomaly event of an anomaly related to operation of the service in the cloud computer system. The anomaly event is detected based on a value of the metric not satisfying the anomaly bound for the metric. The method may include determining whether the first ADRC has a policy for resolving the anomaly in the first container. The method may include, based on determining that the first ADRC does not have a policy for resolving the anomaly in the first container, notifying, the second container, that the anomaly cannot be resolved in the first container. The method may include identifying, by the second ADRC, a policy for the ADRC to resolve the anomaly in the second container. The method may include determining that a rule, in the policy for resolving the anomaly in the second container, is satisfied by the anomaly. The method may include, based on the rule being satisfied, initiating a corrective action identified in the policy for resolving the anomaly in the second container.

In some embodiments, the method may include, based on determining, by the second ADRC, that the second ADRC does not have a policy to resolve the anomaly in the second container, sending, using a communication system, an alert that the anomaly could not be resolved.

In some embodiments, the method may include, based on determining, by the second ADRC, that the second ADRC does not have a policy to resolve the anomaly in the second container, notifying, a third container, that the anomaly cannot be resolved, wherein the third container is one of the components. The third container may include the second container. The method may include identifying, by a third ADRC configured in the third container, a policy to resolve the anomaly in the third container. The method may include initiating corrective action identified in the policy for resolving the anomaly in the third container.

The techniques described above and below may be implemented in a number of ways and in a number of contexts. Several example implementations and contexts are provided with reference to the following figures, as described below in more detail. One particular example implementation is an autonomic system, which is described, is substantial detail. However, the following implementations and contexts are but a few of many.

DETAILED DESCRIPTION OF THE INVENTION

In the following description, for the purposes of explanation, specific details are set forth in order to provide a thorough understanding of embodiments of the invention. However, it will be apparent that various embodiments may be practiced without these specific details. The figures and description are not intended to be restrictive.

In certain embodiments, techniques are provided (e.g., a method, a system, non-transitory computer-readable medium storing code or instructions executable by one or more processors) to automatically detect and resolve anomalies in a computing system such as a cloud infrastructure system.

I. Cloud Infrastructure System

Figure 1:
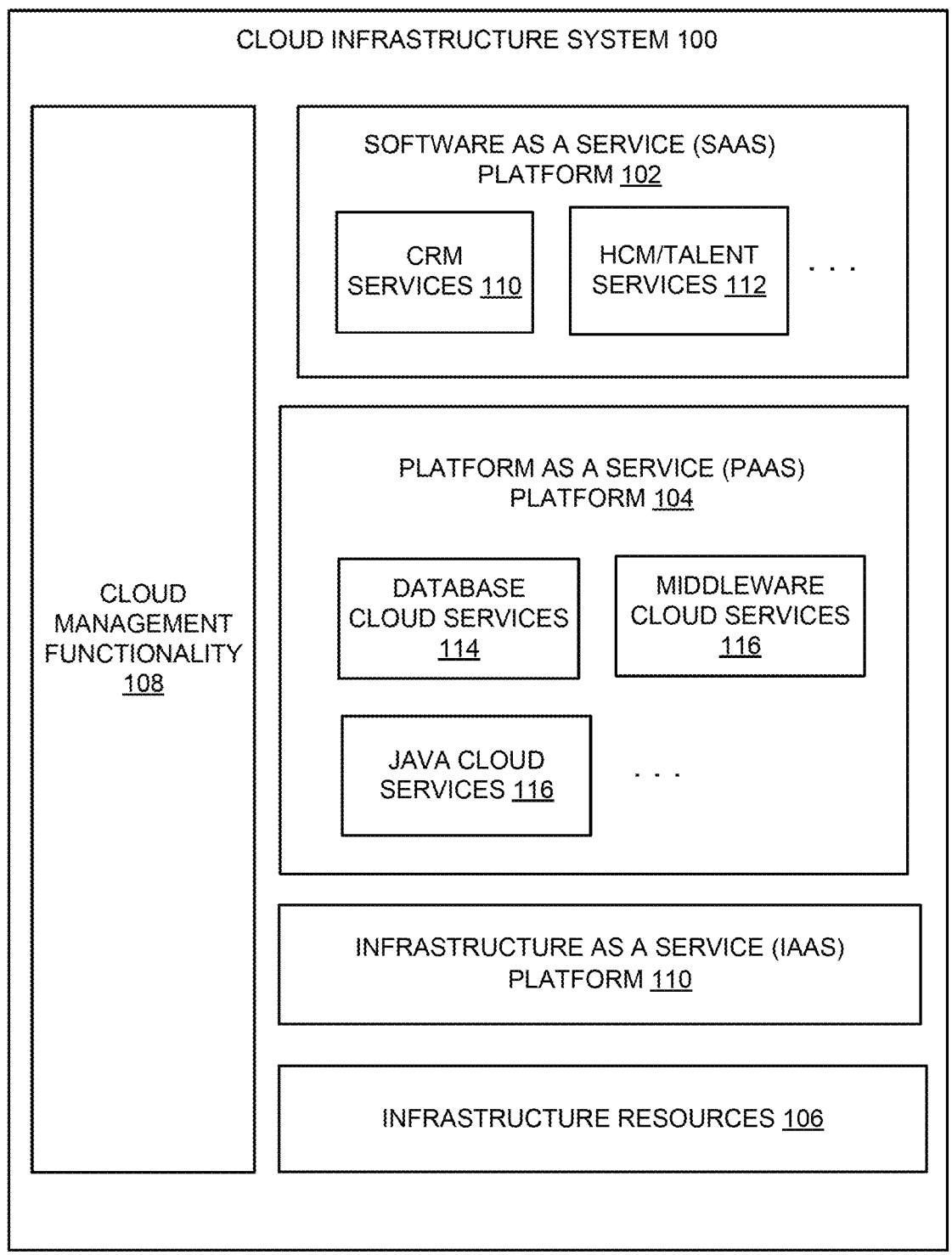
FIG. 1 is a logical view of a cloud infrastructure system according to an embodiment.

FIG. 1 is a logical view of a cloud infrastructure system according to one embodiment. A cloud infrastructure system may provide access to a suite of applications, middleware and database service offerings that are delivered to a customer in a self-service, subscription-based, elastically scalable, reliable, highly available, and secure manner. A cloud infrastructure system may be implemented for a public cloud, such as Oracle Public Cloud provided by Oracle® Corporation.

A cloud infrastructure system may provide many capabilities including, but not limited to, provisioning, managing and tracking a customer's subscription for services and resources in the cloud infrastructure system, providing predictable operating expenses to customers utilizing the services in the cloud infrastructure system, providing robust identity domain separation and protection of a customer's data in the cloud infrastructure system, providing customers with a transparent architecture and control of the design of the cloud infrastructure system, providing customers assured data protection and compliance with data privacy standards and regulations, providing customers with an integrated development experience for building and deploying services in the cloud infrastructure system and providing customers with a seamless integration between business software, middleware, database and infrastructure services in the cloud infrastructure system.

In certain embodiments, services provided by the cloud infrastructure system may include a host of services that are made available to users of the cloud infrastructure system on demand such as online data storage and backup solutions, Web-based e-mail services, hosted office suites and document collaboration services, database processing, managed technical support services and the like. Services provided by the cloud infrastructure system can dynamically scale to meet the needs of its users. A specific instantiation of a service provided by cloud infrastructure system is referred to herein as a service instance. In general, any service made available to a user via a communication network such as the Internet from a cloud service provider's system is referred to as a cloud service. Typically, in a public cloud environment, servers and systems that make up the cloud service provider's system are different from the customer's own on-premises servers and systems. For example, a cloud service provider's system may host an application and a user may, via a communication network such as the Internet, on demand, order and use the application.

A service in a computer network cloud infrastructure includes protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and script-language middleware engine for private use by a networked developer. As another example, a service can include access to an email software application hosted on a cloud vendor's web site.

In FIG. 1, cloud infrastructure system 100 may provide a variety of services via a cloud or networked environment. These services may include one or more services provided under one or more categories, such as Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 100. Cloud infrastructure system 100 then performs processing to provide the services in the customer's subscription order.

Cloud infrastructure system 100 may provide the cloud services via different deployment models. For example, services may be provided under a public cloud model where cloud infrastructure system 100 is owned by an organization selling cloud services (e.g., owned by Oracle® Corporation) and the services are made available to the general public or different industry enterprises. As another example, services may be provided under a private cloud model where cloud infrastructure system 100 is operated solely for a single organization and may provide services for one or more entities within the organization. The cloud services may also be provided under a community cloud model where cloud infrastructure system 100 and the services provided by system 100 are shared by several organizations in a related community. The cloud services may also be provided under a hybrid cloud model, which is a combination of two or more different models.

As shown in FIG. 1, cloud infrastructure system 100 may comprise multiple components, which working in conjunction, enable provision of services provided by cloud infrastructure system 100. In the embodiment illustrated in FIG. 1, cloud infrastructure system 100 includes a SaaS platform 102, a PaaS platform 104, an IaaS platform 110, infrastructure resources 106, and cloud management functionality 108. These components may be implemented in hardware, or software, or combinations thereof.

SaaS platform 102 is configured to provide cloud services that fall under the SaaS category. For example, SaaS platform 102 may provide capabilities to build and deliver a suite of on-demand applications on an integrated development and deployment platform. SaaS platform 102 may manage and control the underlying software and infrastructure for providing the SaaS services. By utilizing the services provided by SaaS platform 102, customers can utilize applications executing on cloud infrastructure system 100. Customers can acquire the application services without the need for customers to purchase separate licenses and support.

Various different SaaS services may be provided. Examples include without limitation services that provide solutions for sales performance management, enterprise integration and business flexibility for large organizations, and the like. In one embodiment, the SaaS services may include Customer Relationship Management (CRM) services 110 (e.g., Fusion CRM services provided by the Oracle cloud), Human Capital Management (HCM)/Talent Management services 112, and the like. CRM services 110 may include services directed to reporting and management of a sales activity cycle to a customer, and others. HCM/Talent services 112 may include services directed to providing global workforce lifecycle management and talent management services to a customer.

Various different PaaS services may be provided by PaaS platform 104 in a standardized, shared and elastically scalable application development and deployment platform. Examples of PaaS services may include without limitation services that enable organizations (such as Oracle) to consolidate existing applications on a shared, common architecture, as well as the ability to build new applications that leverage the shared services provided by the platform. PaaS platform 104 may manage and control the underlying software and infrastructure for providing the PaaS services. Customers can acquire the PaaS services provided by cloud infrastructure system 100 without the need for customers to purchase separate licenses and support. Examples of PaaS services include without limitation Oracle Java Cloud Service (JCS), Oracle Database Cloud Service (DBCS), and others.

By utilizing the services provided by PaaS platform 104, customers can utilize programming languages and tools supported by cloud infrastructure system 100 and also control the deployed services. In some embodiments, PaaS services provided by the cloud infrastructure system 100 may include database cloud services 114, middleware cloud services (e.g., Oracle Fusion Middleware services) 116 and Java cloud services 117. In one embodiment, database cloud services 114 may support shared service deployment models that enable organizations to pool database resources and offer customers a database-as-a-service in the form of a database cloud, middleware cloud services 116 provides a platform for customers to develop and deploy various business applications and Java cloud services 117 provides a platform for customers to deploy Java applications, in the cloud infrastructure system 100. The components in SaaS platform 102 and PaaS platform 104 illustrated in FIG. 1 are meant for illustrative purposes only and are not intended to limit the scope of embodiments of the present invention. In alternate embodiments, SaaS platform 102 and PaaS platform 104 may include additional components for providing additional services to the customers of cloud infrastructure system 100.

Various different IaaS services may be provided by IaaS platform 110. The IaaS services facilitate the management and control of the underlying computing resources such as storage, networks, and other fundamental computing resources for customers utilizing services provided by the SaaS platform and the PaaS platform.

In certain embodiments, cloud infrastructure system 100 includes infrastructure resources 106 for providing the resources used to provide various services to customers of the cloud infrastructure system 100. In one embodiment, infrastructure resources 106 includes pre-integrated and optimized combinations of hardware such as servers, storage and networking resources to execute the services provided by the PaaS platform and the SaaS platform.

In certain embodiments, cloud management functionality 108 provides comprehensive management of cloud services (e.g., SaaS, PaaS, IaaS services) in the cloud infrastructure system 100. In one embodiment, cloud management functionality 108 includes capabilities for provisioning, managing and tracking a customer's subscription received by the cloud infrastructure system 100, and the like.

Figure 2:
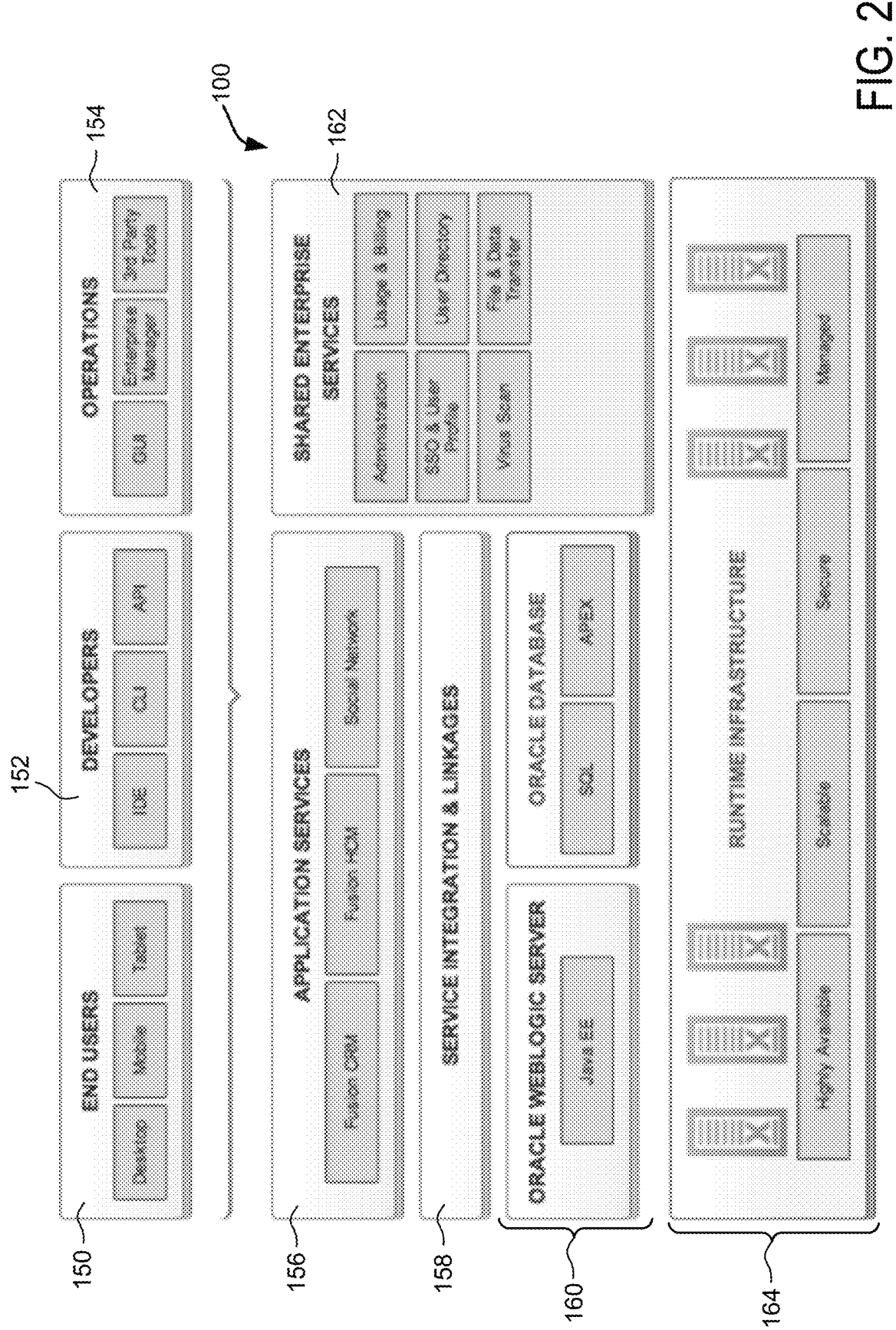
FIG. 2 is a simplified block diagram of a cloud infrastructure system according to an embodiment.

FIG. 2 is a simplified block diagram of cloud infrastructure system 100 according to an embodiment. It should be appreciated that implementation depicted in FIG. 2 may have other components than those depicted in FIG. 2. Further, the embodiment shown in FIG. 2 is only one example of a cloud infrastructure system that may incorporate an embodiment of the invention. In some other embodiments, cloud infrastructure system 100 may have more or fewer components than shown in FIG. 2, may combine two or more components, or may have a different configuration or arrangement of components. In certain embodiments, the hardware and software components are stacked so as to provide vertical integration that provides optimal performance.

Various types of users may interact with cloud infrastructure system 100. These users may include, for example, end users 150 that can interact with cloud infrastructure system 100 using various client devices such as desktops, mobile devices, tablets, and the like. The users may also include developers/programmers 152 who may interact with cloud infrastructure system 100 using command line interfaces (CLIs), application programming interfaces (APIs), through various integrated development environments (IDEs), and via other applications. User may also include operations personnel 154. These may include personnel of the cloud service provider or personnel of other users.

Application services layer 156 identifies various cloud services that may be offered by cloud infrastructure system 100. These services may be mapped to or associated with respective software components 160 (e.g., Oracle WebLogic server for providing Java services, oracle database for providing database services, and the like) via a service integration and linkages layer 158.

In certain embodiments, a number of internal services 162 may be provided that are shared by different components or modules of cloud infrastructure system 100 and by the services provided by cloud infrastructure system 100. These internal shared services may include, without limitation, a security and identity service, an integration service, an enterprise repository service, an enterprise manager service, a virus scanning and white list service, a high availability, backup and recovery service, service for enabling cloud support in IDEs, an email service, a notification service, a file transfer service, and the like.

Runtime infrastructure layer 164 represents the hardware layer on which the various other layers and components are built. In certain embodiments, runtime infrastructure layer 164 may comprise one Oracle's Exadata machines for providing storage, processing, and networking resources. An Exadata machine may be composed of various database servers, storage Servers, networking resources, and other components for hosting cloud-services related software layers. In certain embodiments, the Exadata machines may be designed to work with Oracle Exalogic, which is an engineered system providing an assemblage of storage, compute, network, and software resources. The combination of Exadata and Exalogic provides a complete hardware and software engineered solution that delivers high-performance, highly available, scalable, secure, and a managed platform for providing cloud services.

II. High-Level Overview of Anomaly Detection and Resolution System

Figure 3:
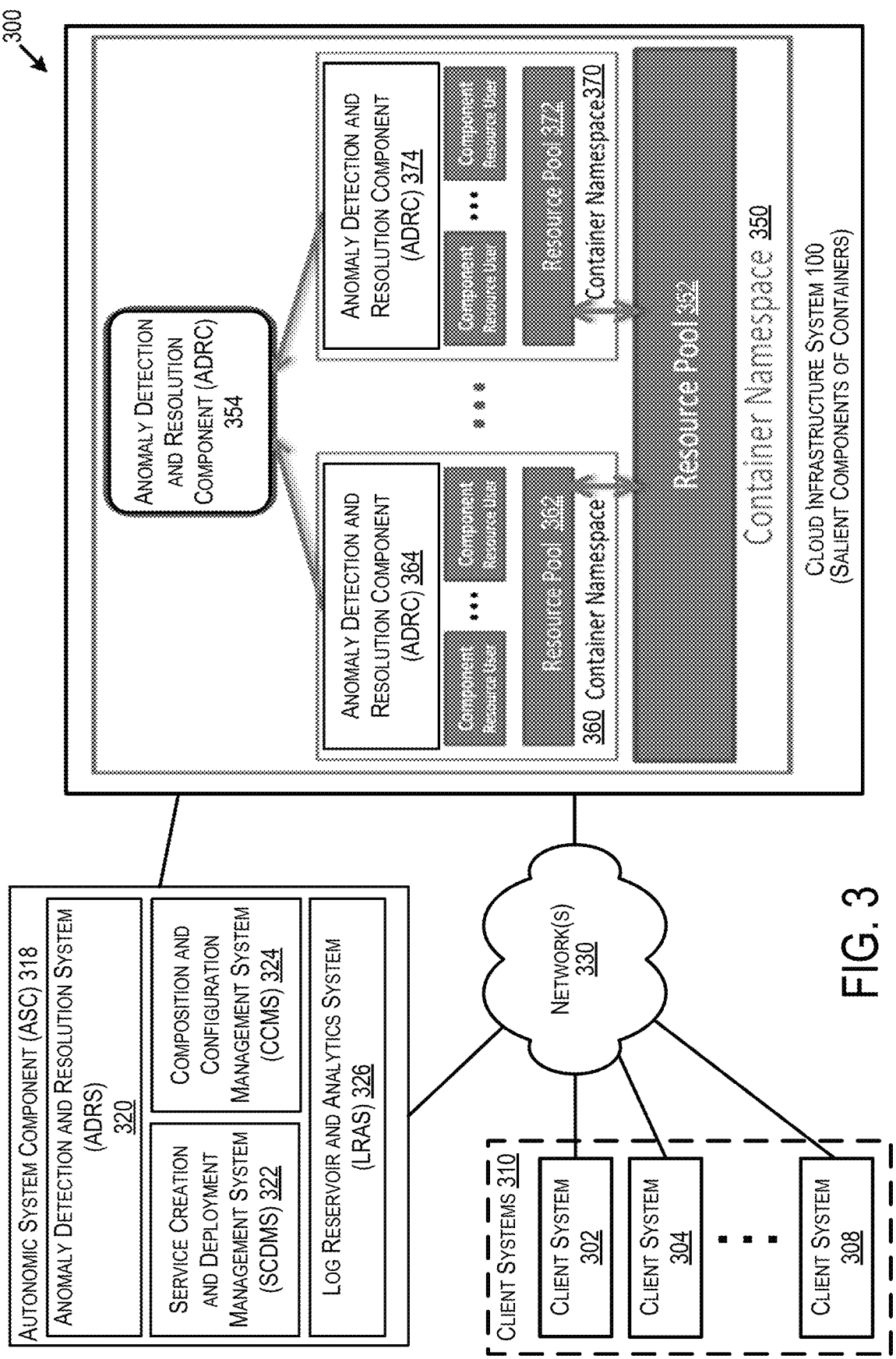
FIG. 3 illustrates a high-level overview of an autonomic system for managing anomalies in a computing system according to some embodiments.

FIG. 3 illustrates a high-level overview of an autonomic system 300 for managing anomalies in a computing system, such as cloud infrastructure system 300. One or more of the below-described techniques may be implemented in or involve one or more computer systems.

System 300 may include client system 302, client system 304, . . . client system 308 (collectively "client systems" or "clients" 310), an autonomic system component (ASC) 318, and cloud infrastructure system 100 of FIGS. 1 and 2, and anomaly detection and resolution system (ADRS) 320. ASC 318 may be included in cloud management functionality 108 of cloud infrastructure system 100. Client systems 310 may be operated by one or more users to access services provided by cloud infrastructure system 100. Client systems 310 and cloud infrastructure system 100 may be communicatively connected via one or more communication networks 330. Examples of communication networks include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth®, and other protocols.

In some embodiments, a computing system, such as cloud infrastructure system 100 may be implemented with one or more components, often times many components, for operating the system. All or some of the components may be related. Components may be defined based on a component model, such as a component model described with reference to FIGS. 4 and 5. As described further below, components can include physical components (e.g., physical machines, network switches, and storage devices), virtual components (e.g., compute virtual machines, Java Virtual Machines (JVM), and virtual network interface controllers (NICs)); and software components (e.g., operating systems and applications).

In the example of FIG. 3, cloud infrastructure system 100 includes one or more components. For example, cloud infrastructure system 100 includes one or more containers. A container (e.g., service container) is a special type of component. A container can provide resources to components running in it or a container can be included in a component. A container can provide a namespace and a resource pool (RP) for components to run. A container can be a component that has a resource pool and provides an environment for other components to run in the container. Cloud infrastructure system 100 includes a component such as a container 350 that provides a container namespace. Container 350 may include multiple components embedded inside container 350, such as container 360 ("container namespace"), container 370 ("container namespace"), and one or more anomaly detection and resolution components (ADRCs) (e.g., ADRC 354). ADRC 354 may be an environment level ADRC. ADRCs are described further below. For example, a JVM can be an embedded container that is running inside a VM that is a container. Components may be implemented in a hierarchical manner such that a component may have embedded components, which may further have components. Components may be defined in a hierarchy of multiple levels, each level corresponding to a component that has components in another level of the hierarchy.

Container 350 may include a resource pool (RP) 352 to provide resources for containers embedded in container 350. Generally within this disclosure, resources may include hardware resources, software resources, firmware resources, or a combination thereof. For example, a RP may include a set of resources such as CPU, memory, storage, IO bandwidth, network bandwidth. A RP may allow RUs to get and return resources from/to it. In some embodiments, a RP may be a dynamic resource pool (DRP) such that resources can be increased or decreased at runtime. A DRP may be dynamic to provide resources individually or shared to containers during run-time. A RP may include or be supported by one or more resource providers. In some embodiments, a container may include a resource provider that provides a resource.

A component such as a container 350 may include at least one resource user (RU). An RU may include a thread or a process running the container. A component within another component (e.g., a container) may be considered a RU. In the example in system 300, container 350 may include one or more components, such as containers 360 and 370, each of which is a RU. For example, container 360 and container 370 may be virtual machines for container 350 which is a physical machine. RP 352 may provide resources to containers 360, 370 in container 350. A component can be a resource provider insider another component. For example, a Java Virtual Machine (JVM) is a user of operating systems resources and provider of resources to Java applications running in it. Therefore, a JVM can be a container embedded inside another container. Resources available to a container can be constrained (caged) so that the container is guaranteed certain amount of resources but does not end up using excessive resources. Each embedded container 360 and container 370 may include a resource pool 362 and a resource pool 372, respectively.

ADRS 320 may monitor and take action to resolve anomalies in processing performed in cloud infrastructure system 100. In particular, ADRS may detect and resolve anomalies in services provided to client systems 310. ADRS 320 can be a component of ASC 318. Although ASC 318 is shown separate from cloud infrastructure system 100, ADRS 320 may be included in or integrated with cloud infrastructure system 100, such as in cloud management functionality 108 of FIG. 1. ASC 318 may be external to cloud infrastructure system 100 and may be communicatively coupled to cloud infrastructure system 100 via network 330. ASC 318 may perform operations disclosed herein as being performed for anomaly management, detection, and resolution.

ADRS 320 may be implemented using a computer system, which may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. For example, ADRS 320 may correspond to a computer system for performing processing as described herein according to an embodiment of the present disclosure. The computing system that makes up ADRS 320 may run any number of operating systems or a variety of additional server applications and/or mid-tier applications, including HTTP servers, FTP servers, CGI servers, Java servers, database servers, and the like. Exemplary database servers include without limitation those commercially available from Microsoft, and the like. In one example, ADRS 320 may be included in or implemented as a service provided by cloud infrastructure system 100, such as Oracle Public Cloud provided by Oracle® Corporation. In various embodiments, ADRS 320 may be configured to run one or more services or software applications described in the foregoing disclosure.

In some embodiments, ASC 318 may be implemented as an enterprise computing system or a cloud computing system comprising one or more computers and/or servers that may include those described above. ASC 318 may include several subsystems and/or modules, including some, which may not be shown. For example, ASC 318 may include, ADRS 320, a service creation and deployment management system (SCDMS) 322, a composition and configuration management system (CCMS) 324, and a log reservoir and analytics system (LRAS) 328. ADRS 320 may be used with SCDMS 320, CCMS 324, and LRAS 326. ASC 318 may be implemented with or operate using one or more ADRCs. As will be described further below, ASC 318 may include or be implemented with one or more subsystems and/or modules in (e.g., embedded in) cloud infrastructure system 100. An ADRC may be a subsystem and/or a module in cloud infrastructure system 100. An ADRC may be a computing system having one or more subsystems and/or modules. ASC 318 may have more or fewer subsystems and/or modules than shown in the figure, may combine two or more subsystems and/or modules, or may have a different configuration or arrangement of subsystems and/or modules. Subsystems and modules of ASC 318 may be implemented in software (e.g., program code, instructions executable by a processor), firmware, hardware, or a combination thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

In certain embodiments, ASC 318 may also provide other services or software applications can include non-virtual and virtual environments. In some embodiments, these services may be offered as web-based or cloud services or under Software as a Service (SaaS) model to the users of client systems 310. For example, ADRS 320 of ASC 318 may detect and resolve anomalies in a cloud infrastructure system 100. The services offered by ASC 318 may include application services. Application services may be provided by ASC 318 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications executing in ASC 318, which may be implemented as a cloud infrastructure system. Users can acquire the application services without the need for customers to purchase separate licenses and support. Various different SaaS services may be provided. Users operating client systems 310 may in turn utilize one or more applications to interact with ASC 318 to utilize the services provided by subsystems and/or modules of ASC 318.

ASC 318 may include at least one memory, one or more processing units (or processor(s)), and storage. The processing unit(s) may be implemented as appropriate in hardware, computer-executable instructions, firmware, or combinations thereof. Computer-executable instructions or firmware implementations of the processing unit(s) may include computer-executable or machine-executable instructions written in any suitable programming language to perform the various operations, functions, methods, and/or processes described herein. The memory in ASC 318 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

ASC 318 may also include or be coupled to storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, ASC 318 may be coupled to or may include one or more data stores. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The data stores may be accessible via a network 330. More or fewer data stores may be implemented to store data according to the techniques disclosed herein.

ASC 318 may be implemented for a computing system, such as an enterprise computing system or a cloud system (e.g., cloud infrastructure system 100), to enable the computing system to operate autonomously. For purposed of illustration, ASC 318 is illustrated in an example of an implementation with cloud infrastructure system 100. Such an implementation is illustrated to show the benefits and improvements to operation of a computing system. However, the embodiments illustrated in the figures with respect to a cloud system are not intended to be limited to a cloud system and may be implemented in many different types of computing systems. ASC 318 can automatically detect and take action to resolve if not mitigate anomalies in performance of the computing system. Examples of anomalies can include response time anomalies, load anomalies, resource usage anomalies, component failures anomalies, and outages anomalies. Different types of anomalies are further described with reference to FIGS. 9 and 10.

Many anomalies occurring in cloud infrastructure system 100 may be caused by factors including load spikes, component failures, and/or malicious use of the system and they are manifested in increased resource usage, deteriorating key performance indicators (KPI), and spikes in errors in one or more containers. Development teams, product managers, business development managers, and systems administrators who deploy services in cloud infrastructure system 100 can come up with a set of Event-Condition-Action (ECA) rules, and refine them over time, to deal with these temporary anomalies for each service so that the anomalies can be resolved programmatically. If the anomalies persist for a long period, then it may have to be considered a new normal and the resource allocation policy for services may have to be reevaluated. Corrective actions for anomalies include spinning up more servers, throttling service request arrival rate, killing some threads or processes, and dynamically reallocating resources from services that are not using the resources to the services that need them on a temporary basis, just to name a few.

ADRS 320 can detect and resolve anomalies based on a classification system of anomalies ("an anomaly classification system"), and a hierarchical rule-based anomaly detection and resolution technology. The ADRS anomaly classification is further described with reference to FIGS. 9 and 10. Anomalies may be classified into one or more categories such as a defined anomaly and an undefined anomaly. Anomalies may be monitored and resolved by ADRS 320 to maintain performance standards for cloud infrastructure system 100. Performance standards can be defined based on one or more system metrics. For example, performance standards may be defined based on one or more quality of service (QoS) attributes for a service provided by cloud infrastructure system 100. QoS attributes may be defined by or for an agreement for a service, such as a service level agreement (SLA). Anomalies may be defined by administrators of the system being monitored, such as cloud infrastructure system 100. Anomalies may be defined based on one or more user-defined system metrics, which may be defined by an administrator. User-defined system metrics may include resource usage, load spikes, malicious use, and component failures.

One or more ADRCs may be implemented external to cloud infrastructure system 100, inside cloud infrastructure system 100, or a combination thereof. The ADRCs may be implemented for ADRS 320. To detect an anomaly and take action immediately to mitigate a problem, one or more ADRCs may be inserted in one or more components in cloud infrastructure system 100. For example, an ADRC may be implemented in each component of cloud infrastructure system 100, such as in each of containers 350, 360, 370, including each embedded container. Each component in containers 360, 370 may include a dedicated ADRC. An ADRC can be implemented at a cloud environment level in cloud infrastructure system 100. For example, an ADRC may be implemented for cloud infrastructure system 100 as a whole (e.g., cloud environment level) in addition to each component in cloud infrastructure system 100. ASC 318 may include an ADRC or may operate as the ADRC at the cloud environment level for cloud infrastructure system 100. Any of the ADRCs in cloud infrastructure system 100 may be implemented to execute on its own, by control from ADRS 320, or a combination thereof. As will be described further in FIGS. 5-7, an ADRC may include multiple components to assist in component level detecting and resolution of anomalies.

An ADRC in a component can detect an anomaly for an event occurring during a process that is being performed. The process may be part of a service that is being provided to a client system. ADRC may utilize anomaly detectors to detect an anomaly defined for ADRS 320. ADRC (e.g., ADRC 354) may determine whether an anomaly resolution policy is defined for the component including the ADRC. If a policy is defined, then ADRC will utilize a policy engine to attempt to resolve the anomaly based on the polic(ies). If the anomaly cannot be resolved or if there is no policy defined for the anomaly, the ADRC may communicate the information about anomaly for the event to a parent component (e.g., container 350) to resolve. The parent component may include an ADRC (e.g., ADRC 354), which can determine how to resolve the anomaly and if any such policy is defined in the parent component.

If a parent component cannot resolve an anomaly, information about the anomaly for the event may be communicated to a higher level parent component of the parent component defined in a hierarchy of components in cloud infrastructure system. Information about the anomaly for the event may be communicated to each subsequent parent component related in a hierarchy of components defined for cloud infrastructure system 100. Upon determining that a component has no parent component, information about the anomaly for the event is published to a messaging system for the ADRS to handle the anomaly at the cloud environment level or to issue an alert.

This hierarchical approach to anomaly resolution is more nimble and is efficient in terms of resource usage compared to centralized anomaly management. By isolating anomaly detection and resolution to the component level, less computing resources may be consumed for resolution of an anomaly as the anomaly is handled in a component or a parent component localized to the occurrence of the anomaly. By reducing the communication of an anomaly to a centralized system, cloud infrastructure system 100 can reduce response time for resolution of an anomaly and in some instances prevent further issues or anomalies from occurring because the anomaly is resolved in a local component. The localized approach to anomaly detection and management can reduce human involvement in addressing thousands of anomalies in large computing systems, such as cloud systems. By localizing anomaly detection and resolution at the component level, a cloud infrastructure system may operate more autonomously with little human involvement.

ADRS 320 may coordinate and manage detection and resolution of anomalies handled at the component level by ADRCs. An ADRC consists of two subsystems, an Anomaly Detection and Notification System (ADNS) and Anomaly Resolution Subsystem (ARS). The ADNS subsystem allows the system administrators to specify which metrics it needs to monitor for anomalies, what conditions to test when an anomaly is detected before publishing an event, and what to include in the event data. The ADNS monitors the relevant metrics for anomalies and when an anomaly is detected, evaluates the condition, and when the condition is true stores the event corresponding to the anomaly along with the event data to a data store local to the component in which the ADRC is implemented. An example of the condition to detect an anomaly is the number of consecutive readings of a metric that are anomalous before an event is raised. The metrics and bounds for anomaly detection are obtained from the SCDMS 322 of the ASC 318 when a service is created. Metrics such as load and resource consumption may be defined by the system administrators and provided by the LRAS 326 of the ASC 318.

In some embodiments, the ADNS may implement a communication system to publishing events. The communication system may implement a notification service. The notification service may facilitate communication with components in cloud infrastructure system 300 and/or ASC 318. Communication may be facilitated through network 330. Information about events and anomalies may be communicated via the communication system using pull and/or push mechanisms, e.g., a push or pull notification service, for communication. Push and/or pull mechanisms may be configured on a subscription basis for the ADRS and the ADRCs.

Figure 4:
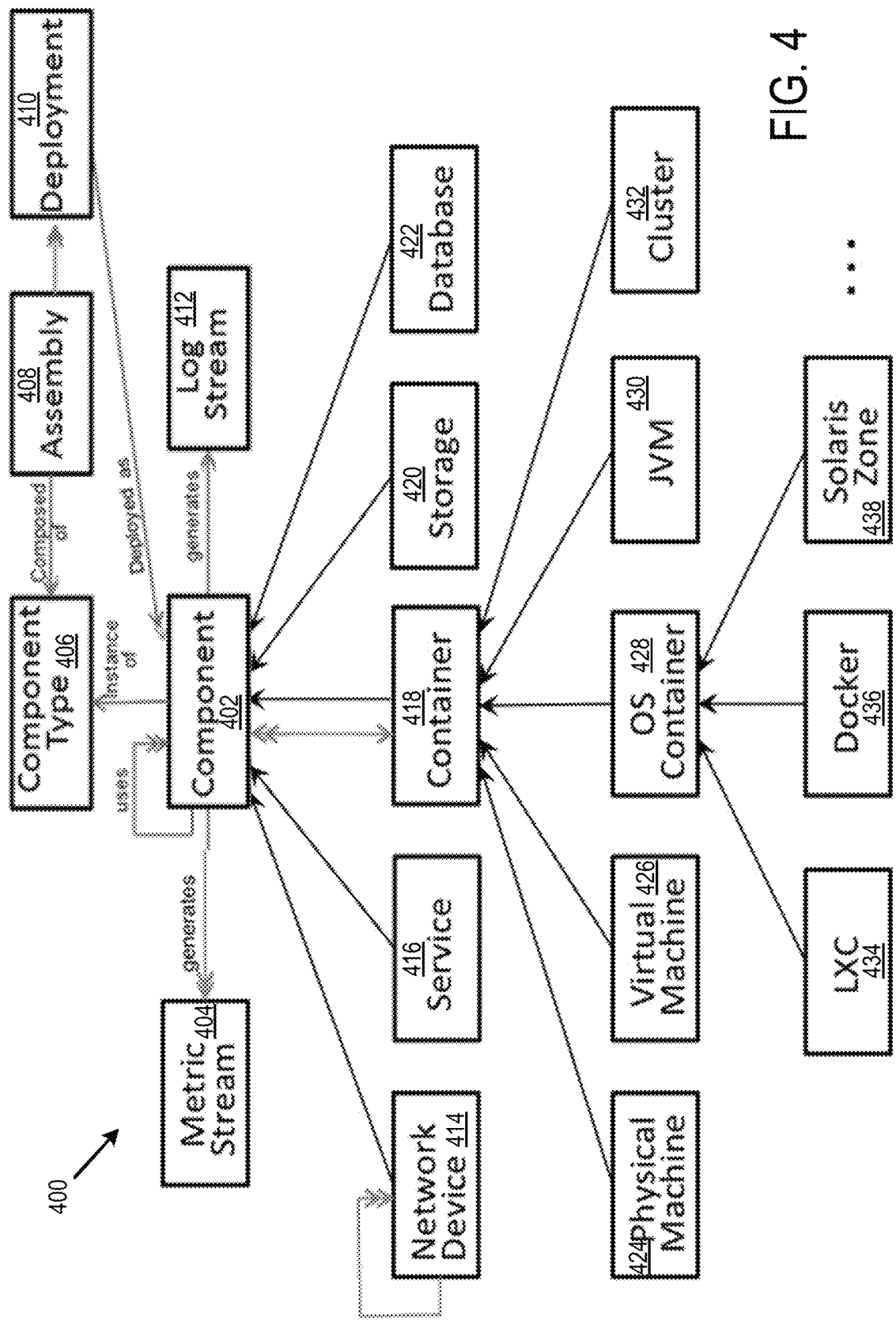
FIG. 4 illustrates a component model of a computing system according to some embodiments.

CCMS 324 utilizes the component model of FIG. 4 to describe the hardware and service (software) components of a system (e.g., cloud infrastructure system 100) and the relationships amongst them and to the log and metric streams they produce. CCMS 324 may manage data stores such as a configuration repository, which is a temporal database that represents the dynamic nature of the configuration due to self-service deployment of services, live migration of virtual machines (VM), capacity scale out, and failover, among others. The configuration repository may be defined based on the component model of FIG. 4. CCMS 324 may leverage information in other configuration repositories such as Oracle Enterprise Manager Repository by Oracle® Corporation and the configuration repository maintained by the underlying cloud operating system (IaaS) such as Nimbula or OpenStack configuration databases.

In some embodiments, SCDMS 322 may use or implement a subsystem called a orchestrator, which provides an abstraction layer on top of different infrastructure-as-a-service (IaaS) to create and configure containers. All of the subsystems created generate identities for the newly deployed components, enforce quotas, and updates the configuration repository with the data about components being deployed, and their dependencies on other services. Individual components update the configuration repository with the home directory and the log and metric streams associated with them. These subsystems created can be accessed via a representation state transfer (REST) application programming interface (API) and command line interface (CLI) for programmatic deployment of assemblies.

SCDMS 322 can enable users (e.g., application developers and administrators) to define components to implement a service. As described in FIGS. 4 and 5, components defining a service may be defined in one or more assemblies. An assembly may be used to provide a highly-automated process that provisions virtual environments in the cloud to deploy the service.

In at least one embodiment, SCDMS 322 may generate and provide one or more interfaces to client systems to enable a user to define attributes for an anomaly. The interface(s) may include a physical interface, a graphical interface (e.g., a graphical user interface), or a combination thereof. A graphical interface may be generated by SCDMS 322 and provided to a client system 310. An interface may be provided as part of SCDMS 322 via network 330 as part of a service (e.g., a cloud service) or application. The attributes for an anomaly may be defined in a declarative manner. For example, a user can defined an anomaly by specifying bounds on key metrics that define the normal system behavior including response times for services, availability of services, resources to be allocated for the service, system load, tolerable error rates, and values expected for other metrics. A user can specify the bounds on metrics to enforce the QoS associated with the SLA for the service for a customer. The bounds for metrics may be defined according to the anomaly data structure described with reference to FIGS. 9 and 10. SCDMS 322 also generates identity of newly deployed components and updates the configuration repository with the component information and their relationships to log and metric streams and to other components.

Orchestrator can be a service application for the creation and deployment of assemblies into cloud infrastructure system 100, where an assembly is a description of a system consisting of one or more VMs, storage, software, and network connectivity allowing the system to operate as per the assembly definition. Orchestrator provides, via an interface, a self-service layer from which a catalog of components and assemblies which are readily available for users for quick deployment of entire software systems, additionally offering features like DNS setup, software bootstrapping, and post deployment resizing functions: VM sizing (vertical scaling), and assembly scaling (horizontal scaling). The orchestrator catalog provides simple versioning, publishing and declarative configuration features as well. Developers can use orchestrator's component framework to implement any number of Assemblies defining systems of all sorts (e.g. Org or function standardized OS images, new and former versions of software applications for testing, released labels, etc). The interface provided by orchestrator may enabling provisioning as follows: (1) Authenticate via SSO to a user interface provided by orchestrator, (2) pick an assembly from orchestrator's catalog, (3) provide a name & sizing information for the assembly instance, (4) provide project name against which quota and metering will operate, (5) se the assembly Instance deployed into the cloud environment, and (6) optionally, stop/start/undeploy the assembly instance, resize the assembly instance's VMs or scale the assembly instance. orchestrator includes an admin interface to allow orchestrator admins to monitor deployments, logs and perform "super user" actions for all users, deployments and catalog for that instance of orchestrator.

LRAS 328 can collect log and metric streams from all the components in the cloud infrastructure system 100, computes the statistics, and applies time-series analytics to determine seasonal bounds for metrics. It computes the trends and seasonal variation in metrics and resource usage of each component for each metric for each interval (e.g. hourly) for each period (e.g. weekly) for normal system operations where user-defined bounds are met more than a certain percentage of the time. These seasonal bounds are pushed to the appropriate component so that it can monitor the metrics, including resource usage, for anomalies. This system also predicts future failures using unsupervised machine learning techniques.

III. Component Model

Figure 5:
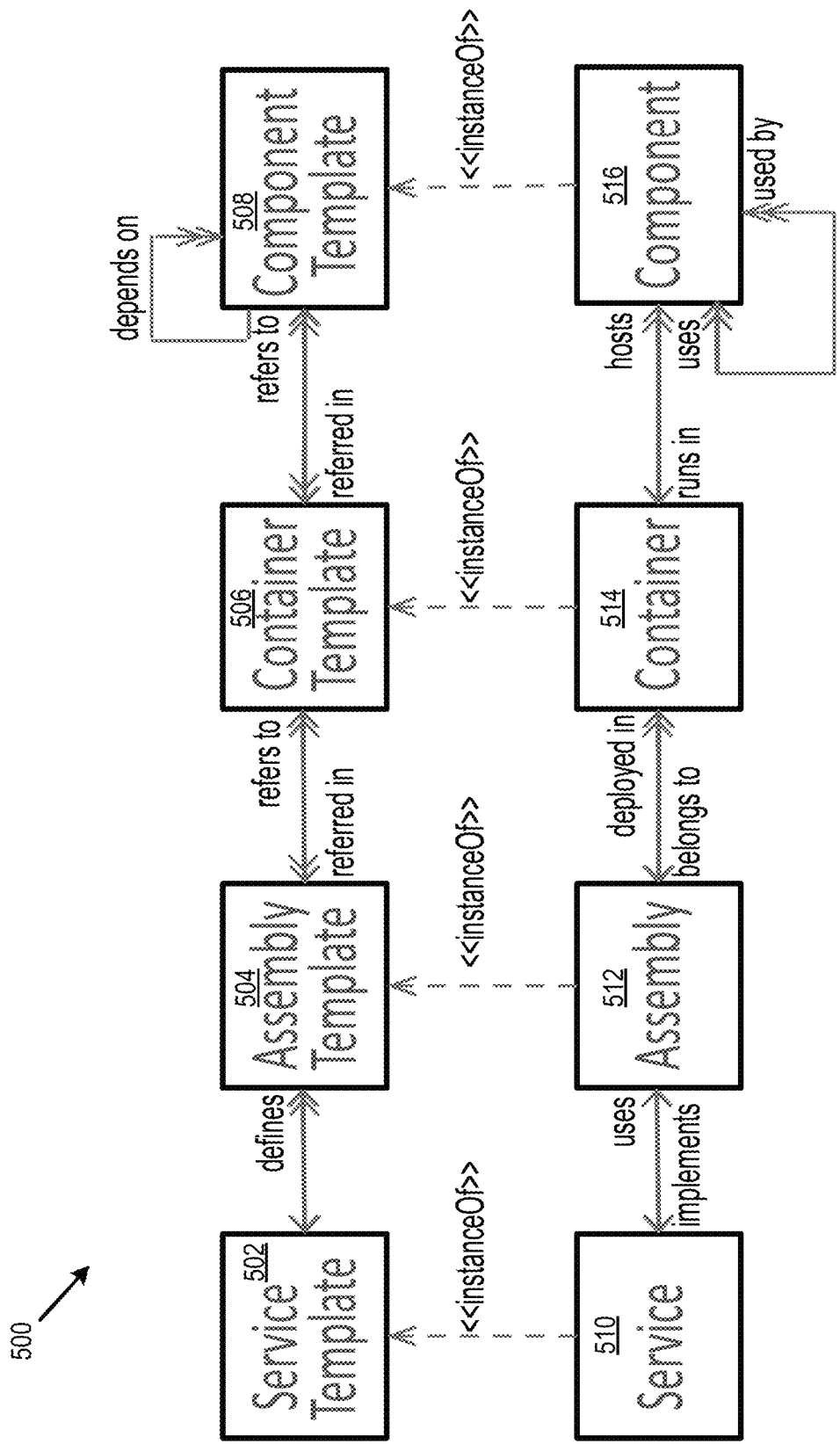
FIG. 5 illustrates a relationships between elements of a component model according to some embodiments.

FIGS. 4 and 5 illustrate a component model for implementing cloud infrastructure system 100. The elements in FIGS. 4 and 5 may be implemented using one or more data structures. The data structure(s) can be managed in storage (e.g., a data store) accessible to ASC 318 or the ADRC utilizing the component model. Each of the illustrated elements may be implemented using one or more data structures organized in a variety of ways depending on how, what, and/or where data is stored. Although each of the data structures are shown including particular data, more or fewer data structures may be implemented to store the data. A data structure can include a reference to other data structures. An instance of each of the data structures may be created for managing storage of different security artifacts. The data structures may be implemented using one or more types of data structures including, without restriction, a linked list, an array, a queue, a hashtable, a map, a record, a graph, or other type of data structure. Each of the data structures may be defined in a declarative manner based on input to ASC 318.

FIG. 4 illustrates a component model 400 of a computing system, such as cloud infrastructure system 100. The components (e.g., containers 350, 360, 370) in FIG. 3 are based on a component model 400. Component model 400 may be used to correlate different metric and log streams. Any service deployment system may include one or more components 402, some or all of which may be related. Each component created by deployment 410 as an instance of one of one or more different component types 406. Components can be related via different kinds of relationships including parent-child, e.g., a physical NIC is a child of bare-metal server in which it is installed, and peer relationships, such as a compensation application using an identity provider to authenticate its users. Some components are containers, which provide resources for other components. A component may generate one or more log streams and one or more metric streams.

A component 402 may be created as an instance of component type 406 and created for deployment 410 based on an assembly 408. Assembly 408 may be a template that describes one or more component types among other information such as component-container relationships, the interconnections needed to create an instance of the service type, and the code for configuring the service. The component types specified in an assembly are to identify the components to be deployed in a component. Deployment 410 may be based on the component types indicated by assembly 408. In some embodiments, an assembly defines the components for providing a service, the resources needed for each of the components, the network and storage configuration, the software to be configured in each of the components, and the bounds for the metrics and response times for monitoring the service. For example, an assembly may consist of one or more VMs with number of CPUs and amount of memory, with software components deployed in them, storage and other services they use, and network connectivity allowing the system to operate as per the Assembly developer's design. An assembly can be used to construct a single or multi-VM based systems of any complexity, such as an IaaS service, a PaaS service, or a SaaS service. An assembly may include VM sizing information (vCPU count, amount of memory), disk storage to be allocated, list of components to be installed, network communication information (source, destination, port), and variables required by the components whose values may be provided during Assembly deployment.

Each component may have an identifier, such as an intrinsic identifier (BD), which is a universally unique identifier (UUID). The BD may be immutable, globally and temporally unique, and always refers to the same component. That is, no two components may have the same BD value even considering the components that existed in the past or will come into existence in the future. A component may have multiple extrinsic identifiers (EIDs). These are like primary keys or other identifiers given to the component. For example, the IP address given to a physical machine is an EID. EIDs may not be permanent and might change during the lifetime of the component. If two components are related via parent-child relationship, i.e., a component embedded inside another, then the child component does not have to have its own BD. Note that a child (or embedded) component may have just one parent.

A component 402 may be defined as one of many different component types including, without restriction, a network device 414, service instance 416, a container 418, storage instance 420, or a database instance 422. For example, a component may include an operating system, a database, a middleware system, an application, a program, or a script. In the example of FIG. 4, a container may include, without restriction, a physical machine 424, virtual machine 426, an operating system (OS) container 428, a Java virtual machine 430, and a cluster 432. For examAn OS container may include, without restriction, a linux (LXC) container 434, a docker container 436, or a solaris zone 438. In another example, a component may include a plugin module for orchestrator to execute. Orchestrator may include data and bootstrapping logic as a program recipes to be invoked during bootstrapping of a virtual machine. A component may include a declaration of a set of variables which is used by components of an assembly.

Component type 406 can define, among other properties, one or more log streams 412 and one or more metric streams 404. Component 402 created as an instance of component type 406 may generate metric streams 404 and log streams 412 defined by component type 406. Both metric stream 404 and log stream 412 can be streams of time series data. Both metric stream 404 and log stream 412 may be written to one or more files, databases, or published directly to one or more topics or queues of a messaging system. The streams are associated in a parent-child relationship with the component that produces them. The entries may contain some context identifiers (such ECID and RID in ODL logs) to relate entries in different components that form the same control flow of a service.

FIG. 5 show service model 500 that illustrates the relationships between the elements of component model 400 in FIG. 4. Specifically, service model 500 is utilized by cloud infrastructure system 100 to provide services (e.g., service instances), such as service 510, to client systems 310. A service 510, or service instance, may be created as an instance of a service template 502. A service may be created via a request/response communication to cloud infrastructure system 100. Such communication may be facilitated using HTTP(S) or direct TCP/IP (e.g., IMAP) protocols. A service template may be defined based on one or more assembly templates (e.g., assembly template 504) associated with it.

An assembly template defines an assembly (e.g., assembly 512). An assembly may be created as an instance of assembly template. An assembly template can define the environment level resources such as shared files system, network, storage available for the container(s) defined in the assembly, and workflow to be executed to deploy the assembly in a cloud environment. For example, if a cloud environment provides HTTP listening service such as Oracle HTTP Service (OHS), and each service creates a virtual host in OHS, then a workflow can be included in the assembly template for the service to create a virtual host in existing system containers running the OHS services. Each assembly template can define QoS characteristics and pricing. For example, a service template may be defined by two assembly templates: one for testing functionality and the other for scalable production deployment.

A service may have several entry URIs associated with it. The listeners for a service are deployed in a dedicated or shared container, which could be a cluster. Services are provided by a sequence of request-response interactions to these URIs. The author of the assembly can include a quality of service monitoring component, which specifies the set of variables representing the entry URIs supported by the assembly and the set of services supported; where each service is a list of entry URIs. The variables for error characteristic define the tolerable rate of errors of certain type.

During a deployment of an assembly, a user may provide input to ADRS to enable SCDMS to determine the desired quality of service by defining fixed bounds or seasonal bounds on the response time and availability for each of the services and the load to be handled by the service instance created to establish the service. Many services can be created from a single service template each using a different assembly template with possibly different QoS characteristics. A service may be created such that all the metrics defined for all the components of the service are within the bounds specified for the service and the container it is running in. Any observed metric values outside the range is considered anomaly and if the anomaly persists for a specified period of time, it will be dealt with on a real-time basis by ADRS 320.

An assembly template can reference one or more container templates, such as container template 506. A container template can define a container type, resources to be allocated, components to be deployed, container-specific metrics, and container-specific anomaly detection and resolution policies. For example, one or more containers (e.g., container 514) can be deployed in its own dedicated containers or in shared containers. A dedicated container does not allow additional components to be deployed in it, although updates to the existing components can still be performed. A container can be in one of two states, open or closed. A component may not be deployable in a closed container.

A non-container component template, such as component template 508, can define configuration specifications, service-specific metrics (including instrumentation) and anomaly detection and resolution policy specific to a component (e.g., component 516). A component may run inside a container. A container may use a component. A container template may refer to a component template for a component to run inside a container created based on the container template. A component may be created as an instance of a component template. Component template may depend on a component template. A component template may declare metrics, such as response times for key URIs. When an assembly is deployed, bounds must be provided for each metric (e.g., response times for application components, number of CPU, RAM, etc. for Containers) defined in the assembly, to create a service which is deployed in a given software/hardware environment.

IV. Detailed Overview of an Anomaly Detection and Resolution Component (ADRC)

Figure 6:
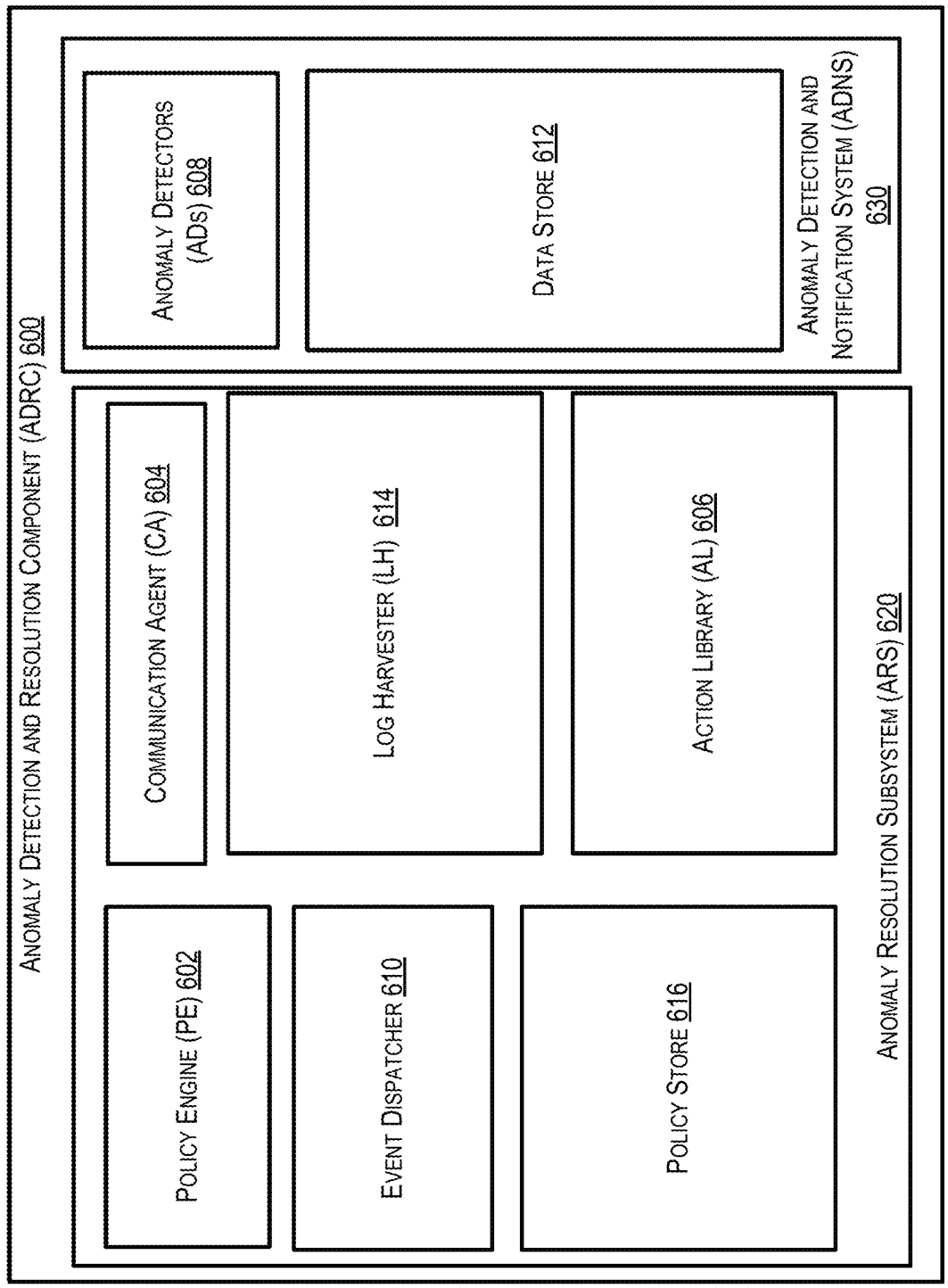
FIGS. 6 and 7 illustrate block diagrams of an anomaly detection and resolution component (ADRC) of an anomaly detection and resolution system (ADRS) according to some embodiments.
Figure 7:
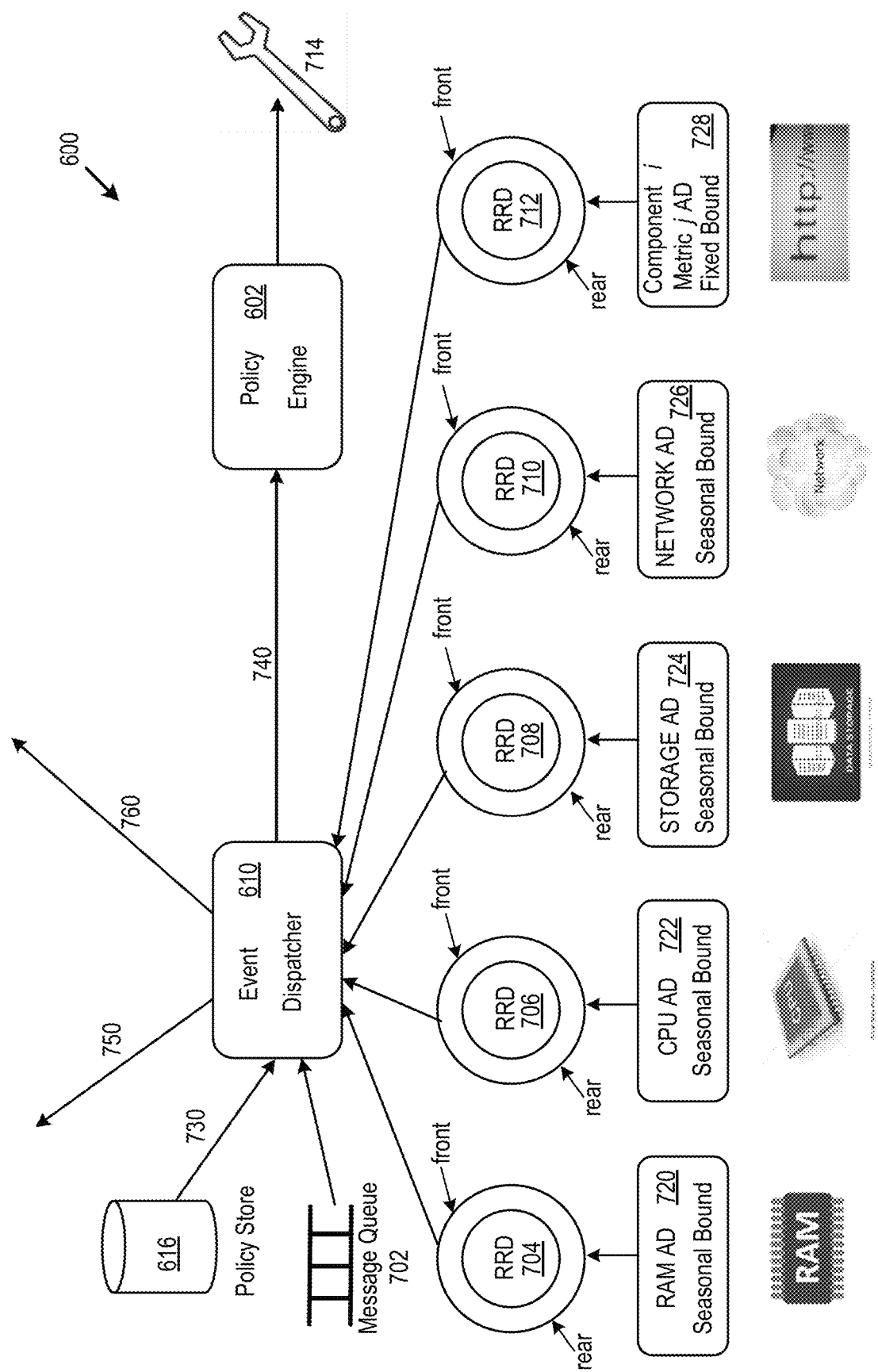

FIGS. 6 and 7 illustrate block diagrams of an ADRC 600 of an ADRS according to some embodiments. An ADRC may be implemented as part of ADRS 320 of FIG. 3. ADRCs may be created for each component in cloud infrastructure system 100. For example, each of ADRCs 354, 364, 374 may be an instance of ADRC 600. As mentioned before, an ADRC can be deployed in components, such as containers, of cloud infrastructure system 100. ADRC may be implemented to detect and resolve anomalies. An ADRC may be implemented using a variety of programming languages, such as Java®.

In some embodiments, ADRC 600 may include one or more subsystems and/or modules. ADRC 600 may include an anomaly detection and notification system (ADNS) 630 and an anomaly resolution subsystem (ARS) 620, which each include one or more subsystems and/or modules. ADNS 630 may include one or more anomaly detectors (AD) 608 and a data store 612. ARS 620 may include a police engine (PE) 602, a communication agent (CA) 604, an action library (AL) 606, an event dispatcher (ED) 610, log harvester (LH) 614, and a policy store 616.

ADRC 600 also include or be coupled to storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, ADRC 600 may be coupled to or may include one or more data stores. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. More or fewer data stores may be implemented to store data according to the techniques disclosed herein.

In at least one embodiment, ADRC 600 may include data store 612, policy store 616, and AL 606. Data store 612 may be implemented as a round-robin database (RRD) or a circular queue. A RRD may be implemented using a circular queue (e.g., a first-in-first-out circular queue). For example, in FIG. 7, ADRC 600 includes multiple RRDs, such as RRD 704, RRD 706, RRD 708, RRD 710, and RRD 712, each specific to a different event data corresponding to a different type of anomaly detected by an anomaly detector. Event data may include information as to the source of the anomaly event in the component in which ADRC 600 is implemented, the cause of the anomaly event, when the anomaly event was detected, and any other information about the anomaly event. RRD 704 may store event data for anomalies detected in RAM. RRD 706 may store event data for anomalies detected in CPU. RRD 708 may store event data for anomalies detected in storage. RRD 710 may store event data for network-based anomalies. RRD 712 may store event data for component specific anomalies.

ADNS 630 may monitor one or more metrics in cloud infrastructure system 100. ADNS 630 is designed to minimize the use of network resources to monitor for anomalies. In particular ADNS 630 may monitor metrics in a component in which ADRC 600 is implemented. One or more anomaly detectors 608 may be employed to monitor a metric, either directly available in some metric stream or computed from some log stream, either by polling or by listening to events. In some embodiments, a component may have multiple ADs, one for each resource in the component. An AD may be implemented for each distinct metric to be monitored. An AD may be implemented for each log type.

Metrics may be monitored using an anomaly classification system described with reference to FIG. 9. An anomaly may be monitored for a metric based on the definition(s) for an anomaly. An AD may be defined for a metric corresponding to a resource usage. The resource may be monitored with respect to an error rate target. An anomaly may be defined by a fixed or seasonal bound. A threshold may be defined for the metric such that the AD is configured to publish an event when the threshold is met. To monitor a metric, the AD may monitor one or more key performance indicators (KPIs), resource usage and errors by a variety of techniques. A metric may be monitored by subscription to events or polling metrics in the system of the component in which the ADRC is implemented. For example, an AD may monitor resource usage by polling operating system metrics or an MBean (managed Java object) attribute in the operating system. An AD may periodically scan relevant log files and listen for operating system logs such as syslogs.

An AD may be component-specific, such that the AD monitors a metric using features specific to the type of component in which the ADRC including the AD is implemented. For example, in a component that is a JVM-type of container, the AD may listen for Java management extensions (JMX) notifications from a MXBean deployed in the JVM to detect an anomaly. In another example, an AD for a LXC container may use stream processing software such as Heka, to detect an anomaly. A stream processing software may enable the ADNS to monitor log and metric streams and apply filters to their values. The filters are designed to detect values out of bounds. An AD may be implemented using a language specific to the type of component in which the AD is implemented. For example, an AD for a JVM container type may be implemented using a Java expression language (JEXL). In some embodiments, the ADNS may be implemented using a sand box style filter that is initialized based on the anomaly classification system for the metric to be monitored. The filter tests the values and remembers the number of consecutive readings that are out of bounds. An anomaly may be detected upon reaching the threshold for an anomaly.

In FIG. 7, ADRC 600 is shown with multiple anomaly detectors such as a RAM AD 720, CPU AD 722, storage AD 724, network AD 726, and component AD 728. Each of RAM AD 720, CPU AD 722, storage AD 724, network AD 726, and component AD 728 may be implemented to detect a distinct type of anomaly in a component in which ADRC 600 is implemented. RAM AD 720 may detect anomalies related to RAM usage. CPU AD 722 may detect anomalies related to CPU usage. Storage AD 724 may detect anomalies related to storage usage. Network AD 726 may detect anomalies related to network activity. Component AD 728 may detect anomalies specific to the component. Each of RAM AD 720, CPU AD 722, storage AD 724, network AD 726, and component AD 728 may have a distinct data store, such as RRD 704, RRD 706, RRD 708, RRD 710, and RRD 712, respectively. A distinct data store for an AD may be utilized to store event data for anomalies detected for the AD. Each of the Ads 720-728 may defined to detect a distinct anomaly. As discussed above, and further described below, an anomaly may be defined by a specific bound of a metric. For example, each of ADs 720-726 may be defined for an anomaly according to a seasonal bound and AD 728 may be defined for an anomaly according to a fixed bounds.

An AD may detect an event ("anomaly event") when a value for a metric satisfies a threshold defined for the anomaly using the anomaly classification system. The AD may define event data for the event and store the event data in the data store 612. For example, event data for an anomaly event may be inserted into data store 612 using Unix datagram. The event data may include additional metrics collected in real time that are then stored with the data about the anomaly event. AD may monitor a bound (e.g., a fixed bound or a seasonal bound) for a defined anomaly. Upon detecting that a value of a metric is not within the bound of a defined anomaly, such that the value is below the minimum measure or above the soft limit, the AD may detect that an anomaly is occurring such that information about an event causing the anomaly may be logged. The AD may write a log entry in a data store 612 to indicate the anomaly and whether the value of the metric is below the min (e.g., low) or above the soft limit (e.g., high).

ARS 620 operates based on events detected by ADNS 630. Event dispatcher 610 may be running in a component in which ADRC 600 is implemented. Event dispatcher 610 may listen for events identified by ADNS 630. In some embodiments, event dispatcher 610 may be notified of an event detected by an AD. Event dispatcher 610 may inspect data store 612 for anomaly events identified by event data inserted by an AD in ADNS 630. For example, each of ADs 720-728 may notify event dispatcher 610 about an anomaly event that is detected. Event dispatcher 610 periodically check each of ADs 720-728 to determine whether information about an anomaly event has been recorded. In some embodiments, event dispatcher 610 may detect anomaly events based on message queue 702. Each of ADs 720-728 may notify event dispatcher 610 of an anomaly event by placing a message on message queue 702. Event dispatcher 610 may process anomaly events based on notification and inspection of RRDs.

Event dispatcher 610 may search policy store 616 to identify each policy (e.g., dispatch policy) that is defined for the anomaly event. Policy store 616 may store dispatch policies to determine how to handle an anomaly event. For example, policies may be anomaly specific such that they are defined for types of anomaly events. Policies may be implemented (e.g., defined) in a language specific to the type of component in which the ADRC 600 is implemented. For example, in a JVM, policies may be defined using JEXL. ADRC 600 can update the policy store 616 for a change in one or more rules of a policy.

A policy may define actions to perform for handling an anomaly event. The action(s) defined in a policy may be pre-defined actions identified in AL 606. A policy may include one or more criteria (e.g., rules or conditions) for one or more types of anomaly events. Each rule may be associated with at least one corrective action as a corrective action pair. Each of the policies may be registered for anomaly events. A rule in a policy may be defined as an event-condition-action (ECA) rule to resolve an anomaly to avoid a QoS violation. Each policy can be associated with one or more events. Relationships amongst components, in particular anomalies occurring in immediate predecessors and successors of the component in a control flow, are considered in the user-defined and system-defined rules. If programmatic action can be taken, it is coded as the action part of a rule. A rule may be define with one or more parameters. In some embodiments, a rule may be defined having five parameters (e.g., a 5-tuple rule). The five parameters may include (1) a list of anomalies (l), (2) a minimum number of anomalies in l (m), (3) a time period or interval during which m anomalies occurred, (4) an action to take for resolving the m anomalies (a), and (5) a time period (q) after which the action is initiated in which the rule will not be considered again (e.g., a quiet period). Actions may be coded using a variety of technologies including operating system or shell commands, and tools like Puppet, Chef, and WebLogic Scripting Tool.

The rule(s) may be declarative or procedural. A declarative rule may be stored in policy store 616. A declarative rule may be executed by a rule engine, such as Oracle Business rule engine provided by Oracle Corporation. A declarative rule system may be supported by a container-specific rule system such as a WebLogic Diagnostic Framework Watch rule system provided by Oracle Corporation. A procedural rule may be defined as a vector of parameters (e.g., a tuple of parameters) used by a procedure and policy engine 602. An example of a procedural rule is a Two-Tier Adaptive Heap Management system of Oracle WebLogic Server provided by the Oracle Corporation. A policy with a procedural rule may be implemented using a managed bean and its behavior may be controlled by a set of parameters using the procedural rule.

Event dispatcher 610 may search policy store 616 to identify one or more policies for resolving an anomaly event. Event dispatcher 610 may determine how to process an anomaly event based on whether a policy is defined for the anomaly. Upon determining that at least one policy is defined for an anomaly event, event dispatcher 610 may retrieve 730 the policies defined for the anomaly event from policy store 616. Event dispatcher 610 may call policy engine 602 to handle the anomaly based on the policy determined for the anomaly event. In some embodiments, event dispatcher 610 may identify multiple policies for resolving an anomaly event. Event dispatcher 610 may choose a policy having a rule with a maximum match of anomalies in a list of anomalies defined by the rule in the policy. Policy engine 602 may be requested to handle an anomaly event upon satisfaction of the rule in a policy for managing the anomaly event. In at least one embodiment, for a policy defining a 5-tuple rule, event dispatcher 610 may request policy engine 602 to handle an anomaly upon determining that the parameters of a 5-tuple rule of a policy are satisfied, such as the minimum number of anomalies during a time period being satisfied. Event dispatcher 610 may choose a rule of a policy with a maximum match of anomalies in the list of anomalies defined for the rule. Upon identifying a policy for which a rule is satisfied for an anomaly event, event dispatcher 610 may send a request 740 to policy engine 602 to resolve the anomaly for the anomaly event. The request may include the identified policies and the event data about the anomaly event. In some embodiments, policy engine 602 may be called to resolve a set of anomalies, where a rule for a policy is satisfied based on an occurrence of multiple anomaly events that occur which satisfy the rule. Event dispatcher 610 may request policy engine 602 may sending the event data corresponding to the anomaly events.

In some embodiments, upon determining that a policy is not defined for an anomaly event, event dispatcher 610 may inform 750 a parent component (e.g., a parent container) about the anomaly event. Communication agent 604 may be configured to communicate within the component including ADRC 600 and parent and child components for the component including ADRC 600. In this manner, ADRC 600 the ADRS 320 can be considered as a rule-based hierarchical anomaly detection and resolution system. The parent component may be a component that is a parent of the component in which ADRC 600 is implemented. For example, should ADRC 364 of FIG. 3 not find a policy defined for an anomaly event in container 360, an event dispatcher in ADRC 364 may communicate 750 the anomaly event to ADRC 354 of container 350 that is a parent of container 360. Upon determining that the parent component cannot resolve the anomaly event (e.g., no policy is identified for the anomaly event), the parent component may communicate the event data for the anomaly event to its parent component, if one exists, for resolution of the anomaly event. When a highest level parent component (e.g., a top level container) has been reached that cannot resolve an anomaly event, the highest level parent component may broadcast information about the anomaly event. In some embodiments, the component including ADRC 600 may be the highest level component. The highest level component may publish information about the anomaly event to a topic which is subscribed to by one or more users or the cloud infrastructure system 100. In some embodiments, the ADRC in the highest level component or the ADRS 320 may attempt to resolve the anomaly event based on the resolution rules and/or informs the operator with detailed description of the anomaly event and including the components (e.g., containers) affected. The policy engine 602 of the ADRC of the highest level component may attempt to resolve an anomaly event acting like a dynamic resource manager. For example, policy engine 602 can adjust resources allocated for a service (e.g., spinning up/down more containers of a cluster) to resolve the anomaly event.

Event dispatcher 610 may communicate the anomaly event to the parent component in a variety of ways. Event dispatcher 610 may send a notification to an ADRC of the parent component about the anomaly event. The ADRC of the parent component may subscribe to receive notifications from ADRC 600. Thus, when event dispatcher 610 sends (e.g., pushes) a notification about the anomaly, the ADRC of the parent component may receive the notification as part of a subscription. In some embodiments, event dispatcher 610 may place the event data about the anomaly event in a data store, such as a queue or an RRD of the parent component. The ADRC of the parent component may include an event dispatcher that checks the data store for event data, which is identified when event dispatchers 610 places the event data in the data store. In some embodiments, event dispatcher 610 may send an alert 760 to one or more recipients (e.g., operators or administrators) to notify them of the anomaly event. The alert 760 may be sent as an alternative to or in addition to sending a notification to a parent component or resolving the anomaly event based on a policy. For example, the alert 760 can be sent as a Kafta topics using a distributed stream processing framework such as Samza.

At step 714, policy engine 602 may perform one or more operations with respect to an anomaly event identified by event dispatcher 610. The operation(s) may include performing a corrective action to mitigate if not resolve a source or cause of the anomaly event. The policy engine 602 may evaluate the condition(s) for each rule in the policies identified by event dispatcher 610. Each rule may be evaluated to determine whether it is satisfied, and if so the corrective action associated with the rule may be initiated by policy engine 602. Corrective actions defined for the rule(s) of a policy may be relevant to providing resources for enabling a service. Examples of corrective actions may include returning unused resources to the current component, requesting for more resource from the component, throttle/stop service requests, kill threads or processes, informing ADRS 320 of the component about a resource usage spike related to the anomaly event, increase resource allocation to VM processes, increase resource allocation to VMs, increase number of servers in clusters, power up physicals, reduce servers in clusters, reduce VMs in physicals, throttle load, and power down physicals.

In FIG. 6, LH 614 may be implemented to harvest log files for analysis of anomaly events. LH 614 can collect data from log streams and metric streams for the component that includes ADRC 600. LH 614 can associate each stream with the identity of the component that produced the stream. LH 614 can be implemented as a script to regularly harvest the log files that are rotated out or at a regular interval for live logs (e.g., hourly), attach relevant meta data to them, and send them to the Log Archive. The log files can be analyzed by ADs to detect an anomaly event. Log harvesting is further described with reference to FIGS. 13-15. LH 614 may send the log files to LRAS 326 of ADRS 320 for central management.

V. Example of a Hierarchical Implementation of an ADRS

Figure 8:
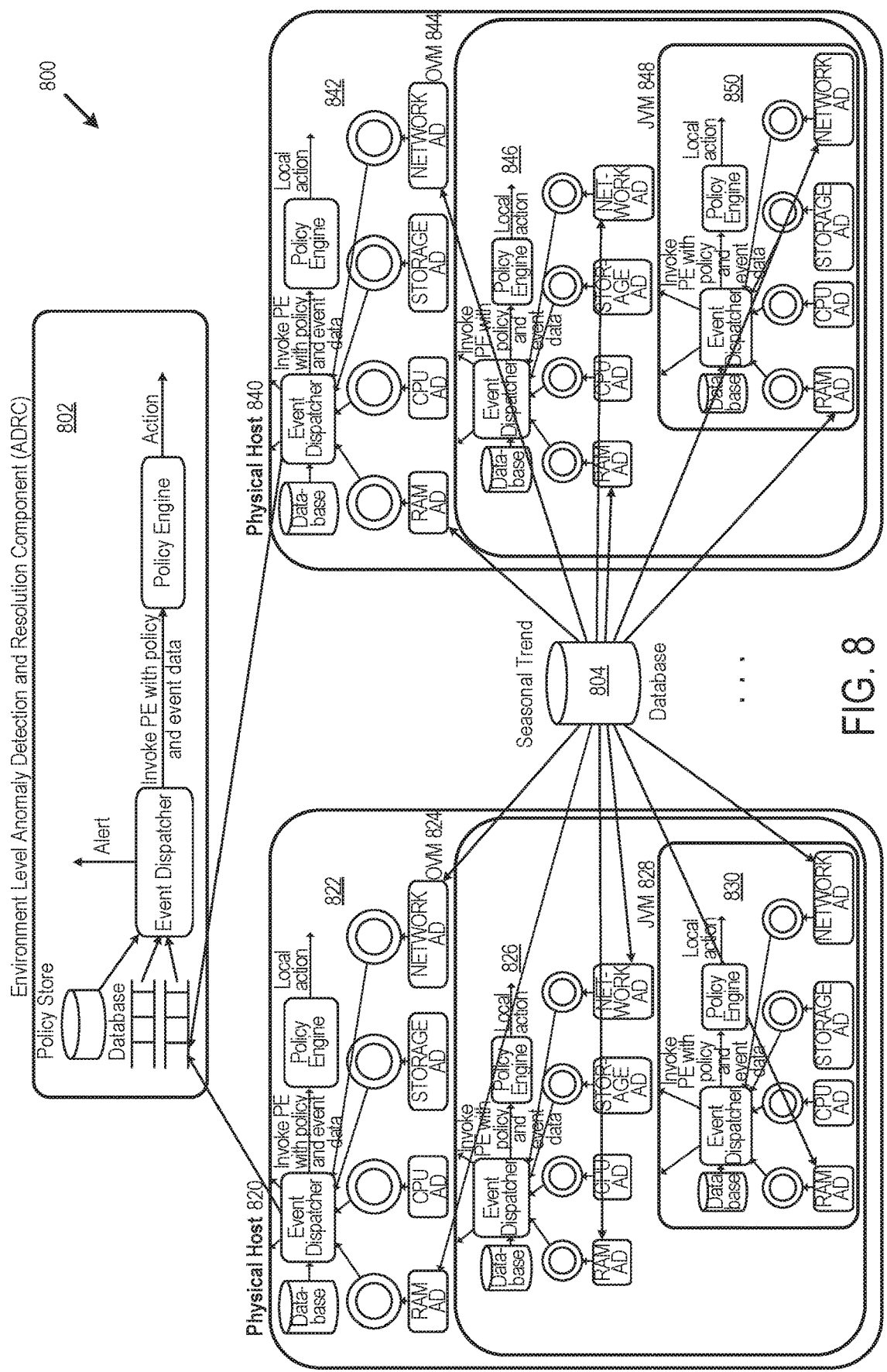
FIG. 8 illustrates an example of an autonomic cloud computing system implemented with a hierarchical ADRS according to some embodiments.

FIG. 8 illustrates an example of an autonomic cloud computing system 800 implemented with a hierarchical ADRS according to some embodiments. ASC 318 of FIG. 3 and one or more ADRCs may be implemented in cloud computing system 800 to provide a hierarchical ADRS. The example in FIG. 8 expands upon the features of the ADRS illustrated in FIGS. 3-7.

Cloud computing system 800 may include an ADRC 802 at the cloud environment level of cloud computing system 800. ADRC 802 may operate as an environment controller for multiple components, such as physical host computing system 820 and physical host computing system 840, in cloud computing system 800. Each of host system 820 and host system 840 includes its own ADRC 822 and ADRC 842, respectively.

Host system 820 includes a sub-container 824, which is a VM. Container 824 includes a sub-container 828, which is a Java VM (JVM). Each of container 824 and container 828 include their own respective ADRC 826 and ADRC 830. Similarly, host system 840 includes a sub-container 844, which is a VM. Container 844 includes a sub-container 848, which is a Java VM (JVM). Each of container 844 and container 848 include their own respective ADRC 846 and ADRC 850. Each of the ADRC depicted in cloud computing system 800 may be part of an hierarchical ADRS. In the hierarchical ADRS, each ADRC in a component monitors activity to identity anomaly events. As described with references to ADRC 600, an ADRC may determine whether a policy is defined for an anomaly event detected in the ADRC. Upon determining that no policy is defined for handling an anomaly event, an ADRC may communicate the anomaly event to a parent component if one exists. The anomaly event may be propagated up to an ADRC of a parent component and further along to parent components until an ADRC of a parent component can identify a policy for handling an anomaly event. Event data for an anomaly event may be propagated to an ADRC 802 of a highest level component in cloud computing system 800. The highest level component may be at the cloud environment level for cloud computing system 800. For example, if no policy is determined at ADRC 830, an anomaly event detected at ADRC 830 may be communicated to ADRC 826 of component 824 which is a parent of component 828. If not policy is determined at ADRC 826, ADRC 826 may communicate the anomaly event to ADRC 822 of component 820, which is a parent component of component 824. If not policy is determined for the anomaly event at ADRC 822, component 820 may communicate the anomaly event to ADRC 802 of the cloud computing environment level of cloud computing system 800.

Each of the ADRCs in cloud computing system 800 may monitor activity of anomaly events in each of the respective components. Using a LRAS of the ADRS, each ADRC may capture or log information about activity, including anomaly events, which are reported to a data store, e.g., seasonal trend DB 804. As described below, a seasonal trend DB 804 may be utilized to assess anomaly events based on seasonal defined anomalies.

The data store 804 may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. More or fewer data stores may be implemented to store data according to the techniques disclosed herein.

VI. Anomaly Classification

Figure 9:
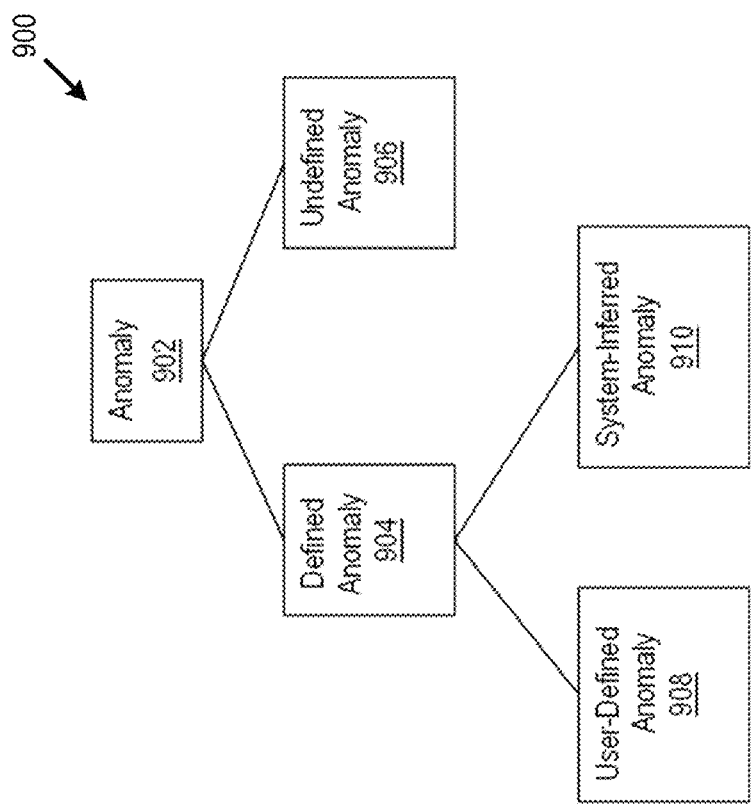
FIG. 9 illustrates a hierarchical anomaly classification structure according to some embodiments.

FIG. 9 illustrates a hierarchical anomaly classification structure 900 according to some embodiments. Anomaly classification structure 900 may be implemented using one or more data structures organized in a variety of ways depending on how, what, and/or where data is stored. Although each of the data structures are shown including particular data, more or fewer data structures may be implemented to store the data. A data structure can include a reference to other data structures. An instance of each of the data structures may be created for managing storage of different security artifacts. The data structures may be implemented using one or more types of data structures including, without restriction, a linked list, an array, a queue, a hashtable, a map, a record, a graph, or other type of data structure. Each of the data structures may be defined in a declarative manner based on input to ADRS 320.

Many service instances can be created from a service type each with possibly different performance, scalability, availability, resource consumption, and error characteristics. The values of each metric (or variable) defining a service can be defined using measures including a minimum (min) measure, a maximum (max) measure, and a max soft limit (SL) measure. An administrator can specify the min, the max, and the max SL for each key metric that defines the normal system behavior including response times for services, availability of services, resources to be allocated for the service, system load, and values expected for other metrics. The administrators can specify the bounds on these metrics to enforce the service level agreements (SLA) for the service. The service instance is considered to be normal if all the metrics are within the min and the max SL specified for the service instance and the container the service instance is running in. If any of the metrics is below the min or above the max SL, the service may be deemed to be in anomalous state and real time anomaly resolution will be initiated. The variables for error characteristic define the tolerable rate of errors of certain type.

Anomalies may be defined as a variety of types using structure 900. An anomaly 902 can be defined as either one of a defined anomaly 904 or an undefined anomaly 906. Each anomaly may be defined by a bound ("anomaly bound"), based on which an anomaly event is detected. An undefined anomaly 906 is an anomaly that is not defined and may be discovered by techniques such as machine learning or statistical methods. LRAS 326 may be configured to analyze metric and log streams offline to discover undefined anomalies. Undefined anomalies may include those anomalies that are not defined by bounds on key performance indicators or log statistics.

A defined anomaly 904 can divided into two categories, a user-defined anomaly 908 or a system-defined, or system inferred anomaly 910. A defined anomaly 904 is defined based on bounds on any metric to be monitored and may be defined by bounds, which are either fixed bound or seasonal bound. Application administrators using SCDMS 322 can define fixed bounds or seasonal bounds for user-defined anomalies to monitor and enforce quality of service of service-level agreements (SLA), resource usage, and other constraints. System administrators may also define additional metrics, for example, to monitor resource usage, load spikes, malicious use, and component failures among others.

A defined anomaly 904 may be defined by users (e.g., administrators) to enforce QoS (e.g., response time for a service). A fixed bound may be used for configuring a user-defined anomaly. A fixed bound can be specified by five parameters as a 5-tuple including (1) a polling interval (pi) for the metric value that is used only if notification is not available for the metric value change, (2) a minimum measure that is the minimum expected of the metric value, (3) a maximum SL that is the soft limit on the maximum, (4) a maximum measure that is the hard maximum limit, and (5) a minimum consecutive readings (mcr) that is the minimum number of consecutive readings of the anomalous readings before an event is raised. A system can be considered normal, without an anomaly, if all the values of the metrics defined for anomaly detection are within the min and max SL values. If any of these metrics goes outside this range, the system is considered to be in anomalous state. If a metric value is anomalous mcr consecutive readings then an anomaly event may be raised.

A user, such as a system administrator may monitor indicator metrics whose bounds will be inferred by the system to keep QoS metrics in bound (e.g., CPU load). System administrators may also define a set of metrics for containers (a subtype of component) and let the system automatically compute the seasonal bounds for their values to avoid anomalies. This kind of anomaly is referred to as a system-defined anomaly 910. The seasonal bounds for a system-defined anomaly 910 can be computed for each container for each metric for each hour for each day of the week by the LRAS 326. For example, the number of processes or threads running in a container, or a CPU load of the container may need to be monitored to detect certain impending anomalies but the system administrators are unable to determine the appropriate bounds for them. In these examples, these metrics are used in system-inferred anomaly 910 and the system will compute the seasonal bounds for them based on trends of historical data.

A seasonal bound can be defined as a fixed bound for a time period. A seasonal bound anomaly can be specified by five parameters as a 7-tuple including a polling interval (pi), a minimum measure that is the minimum expected of the metric value, a maximum SL that is the soft limit on the maximum, a maximum measure that is the hard maximum limit, a duration (d) specified as the number of consecutive readings, a start time (st) and an end time (et) during which the bound is valid. St and et can be specified as relative to start of the day of a week. This kind of bounds is typically used for the system-inferred anomaly where the bounds are computed from historical data on the metrics and the trends of the metric values for user-defined anomalies. For system-inferred anomalies, trends and seasonal variations on indicator metrics, such as key performance indicators, and statistics on log entries are computed (e.g., average number of exceptions of a certain kind should not exceed a certain number in a certain time frame) using the normal system behavior defined by user-defined anomalies. When analyzing the time series data of log files to compute seasonal bounds for system-inferred anomalies, the time intervals in which user-defined anomalies for a service go from normal to abnormal or vice versa, and focus on the metric values and log entries in that interval in related log files in immediate predecessor and successor components of the service to compute the seasonal bounds.

VII. Bounds for Detection of Defined Anomalies

Figure 10:
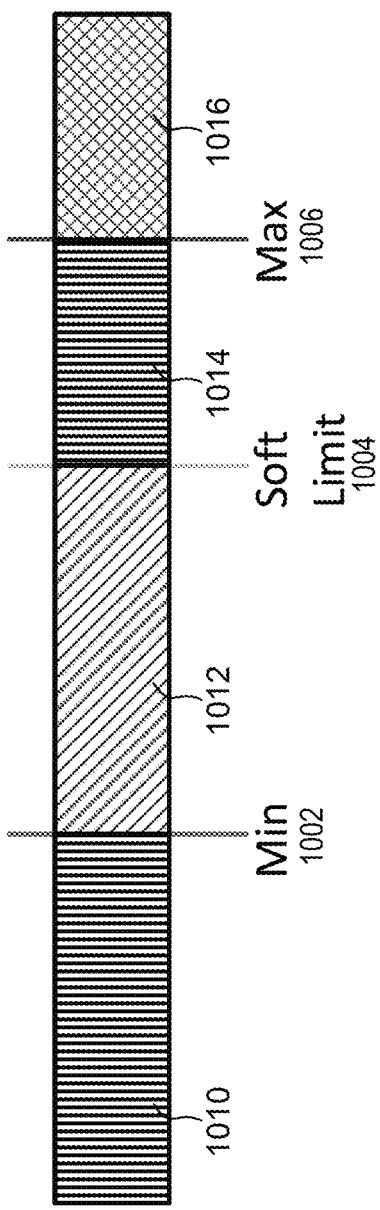
FIG. 10 is a block diagram illustrating a bound for a defined anomaly according to some embodiments.

Now turning to FIG. 10 is a block diagram 1000 illustrating a bound for a defined anomaly. A metric value for a service or operation in a cloud computing system can be defined as a fixed bound by a 5-tuple of parameters or a seasonal bound by a 7-tuple of parameters. The parameters of either bound can include a min measure 1002, a max measure 1006, and a SL 1004 (e.g., max SL). The metric may be identified as representing an anomalous state when the measure of the metric is a value 1014 that satisfies the SL threshold 1004, such that the value of the metric is within the SL and the max. An anomaly detector may identify an anomaly event as occurring when the value of the metric is a low value 1010 below the minimum 1002 or above the SL or when the value of the metric is a high value 1014 at or above the SL 1004 but no higher than max 1006. In other words, when the metric value is a normal value (e.g., no anomaly) within a normal range 1012 when it is at or above the minimum 1002 and less than the SL 1004. A value for a metric may indicate a problematic state, beyond an anomaly when the value 1016 for a metric is above max 1006. When a problematic state is detected, action may be taken by a policy defined to resolve the problem.

VIII. Operations for Anomaly Detection and Resolution

Figure 11:
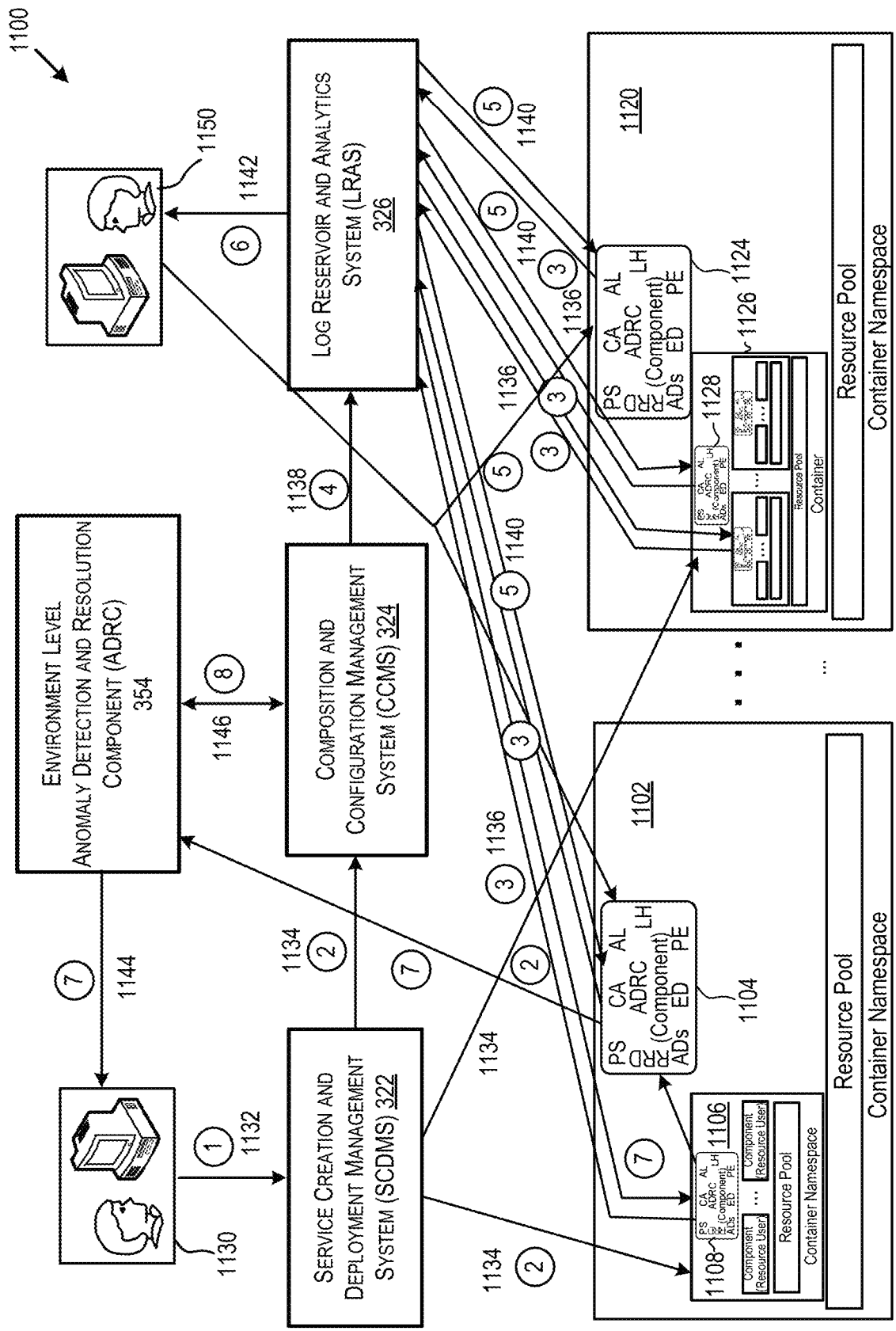
FIG. 11 illustrates a block diagram of operations performed in an autonomic cloud infrastructure system according to some embodiments.

FIG. 11 illustrates a block diagram 1100 of operations performed in an autonomic cloud computing system (e.g., cloud infrastructure system 100) by ASC 318 of FIG. 3 according to some embodiments. At step 1132 (Step 1), a user (e.g., deployer 1130) selects one or more assemblies for creating a service in cloud infrastructure system 100. SCDMS 322 may provide one or more interfaces to a client system operated by the user to configure a service by defining an assembly. Through the interface, the user may request to deploy the assemblies to instantiate a service. At step 1132, the user may provide values for the variables, including fixed or seasonal bounds in the assembly in accordance with the QoS for SLA agreement for the service to be provided by cloud infrastructure system 100.

At step 1134 (step 2), SCDMS 322 can create (e.g., create an instance of) one or more component types to create components to establish the service. SCMDS 322 may request CCMS 324 to create the components for the service. One or more ADRCs (subsystems) may be created and deployed. Each component may include an ADRC subsystem. CCMS 324 may deploy the ADRC subsystems and the components of the service in newly created containers. For example, ADRC 354 may be created and deployed at the cloud environment level of cloud infrastructure system 100. Each of containers 1102 and 1120 may include an ADRC 1104 and ADRC 1124, respectively. Container 1106 in container 1104 may include ADRC 1108. Container 1126 in container 1124 may include ADRC 1128.

SCDMS 324 may request each component to configure itself. Each component may create its home directory, installs the software needed, sets the configuration parameters, and updates the component repository with the components (instances) deployed, their relationships to log and metric streams, and the components in the upstream and downstream control flow of the components in. CCMS 324 may include a data store (e.g., a configuration repository) of the current and past configurations of the cloud infrastructure system 100. The configuration repository can use the component model to describe relationships amongst components of a cloud environment and the log and metric streams they produce.

At step 1136 (step 3), as services are being used, the log harvester in each of the ADRCs may collect log and metrics streams from components from live and rotated logs at the interval configured and send them to LRAS 326.

In step 1138 (step 4), LARS 326 can use an algorithm (e.g., an attribute association algorithm) to find metrics that affect the user-defined metrics. LRAS 326 can then perform time series analytics on the log and metric streams utilizing the configuration data stored in the configuration repository. Seasonal bounds for s system-inferred anomaly are computed in this step.

At step 1140 (step 5), the seasonal bounds and other information are pushed to the ADRC of the appropriate containers where the bounds of ADs are updated. At step 1142 (step 6), anomalies and attribute associations can be analyzed and rules in a policy can be modified by a user 1150 (e.g., an administrator). At step 1144 (step 7), unresolved anomaly events at an ADRC in a container are propagated up to high level ADRCs in parent containers, until reaching the environment level ADRC 354. An anomaly event may be unresolved if no policy can be located for handling the anomaly. ADRC 354 can issue an alert to users to notify them about an unresolved anomaly.

At step 1146 (step 8), ADRC 354 can be operated to update changes in configurations in the configuration repository. An operations teams can then monitor the system for unhandled anomalies. For each of the unhandled anomaly, the team needs to meet and decide what additional metrics to monitor and/or what rules need to be developed or modified to address the anomaly.

IX. High-Level Overview of Log File Flow

Figure 12:
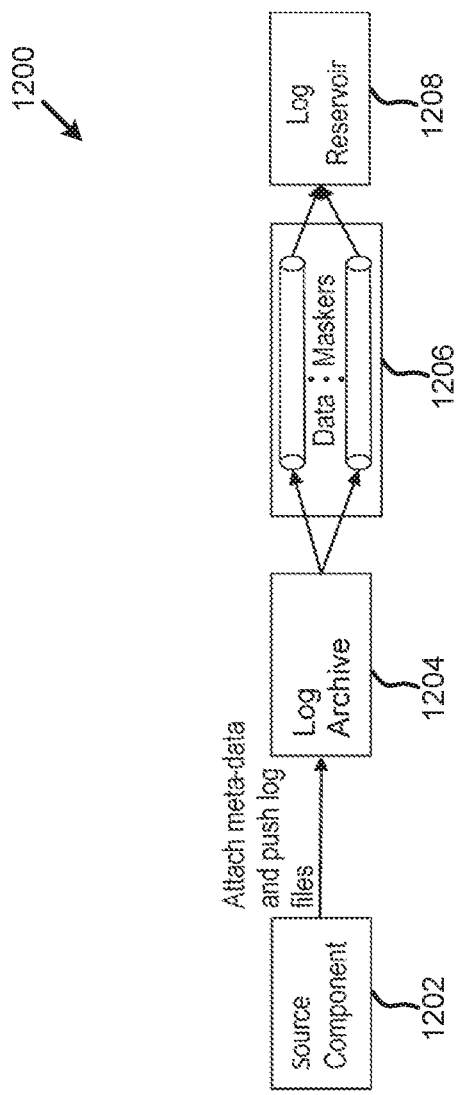
FIG. 12 illustrates a high-level diagram of a log file flow according to some embodiments.

FIG. 12 illustrates a high-level diagram of a log file flow 1200 according to some embodiments. Cloud systems produce a lot of log files, diagnostic data, and metrics. Log files may be generated by one or more components (e.g., source component 1202) in cloud infrastructure system 100. Metadata corresponding to the log files along with the log files are pushed to a data center or security zone-specific data store (e.g., log archive 1204).

Log files contain a wide variety of data from performance metrics to failed login attempts. They are also used by diverse groups of users from security experts and lawyers doing forensic analysis to support engineers troubleshooting hosting environments and product developers debugging applications. Every cloud service provider has some policies governing log file retention and access. Typically, log files are moved, content unaltered, to a log archive 1204 where the access and retention policies are enforced. Authorized personnel are given privileges to search relevant log files in the archive and such searches are usually done online, either manually or via a simple OS script, and may involve meta data-based search as well as key word-based search.

A new pattern of log file usage has emerged recently. It is generally referred to as Log Analytics. Its goal is to discover latent information contained in a large number of log files of a large number of log types over a large number of systems over a long period of time. More specifically, log analytics strives to: understand the systems behavior that produced the data in the log files, and develop a model to forecast impending problems, monitor anomalies, and provide feedback for optimal resource usage based on the long-term behavior of a large collection of similar systems. This pattern is best applied to a large collection of log files collected from many Log Archives after sensitive data has been masked by one or more data markers (1206). The data store used for log analytics is referred to as a Log Reservoir. The characteristics of the log reservoir are different from those of the log archive as shown in Table 1.

TABLE 1

Characteristics of Log Archive and Log Reservoir

| Store Characteristic | Data | |
|---|---|---|
| | Archive | Reservoir |
| Content | Original log files; may contain PII and sensitive data | Processed log files; PII and sensitive data replaced by one-way hash codes sometimes referred to as a "Token" |
| Retention | As per cloud operator guidelines; from 90 days to 6 years depending on the log type | Long term; may extend beyond 6 years or may never be deleted |
| Size | Terabytes | Petabytes |
| Usage | Legal/Security discovery, environment troubleshooting, product defect detection, and monitoring by humans | Resource usage trends computation, anomaly detection, failure prediction by programs |
| Access Mechanism | Manual, OS file system access and search. Content may be indexed | Programmatic, batch access; may use non-standard (e.g. non POSIX) file system. Content usually not indexed. |
| Access Control | Strict access control based on a need-to-know basis or one-off approval based on data type and planned use (e.g. FED) | Less strict access control allowing statistical and analytical programs to access data |

Services running in a container 1202 write their log entries to log files and the log files are rotated on a regular basis, say once a day. A log harvesting script running on the source machine can regularly harvest the log files that are rotated out, or at a regular interval for live logs (e.g., hourly), attach relevant meta data to them, and send them to the Log Archive 1204. Data maskers 1206 then read the data from the Log Archive, mask the sensitive data, and send it to the Log Reservoir 1208. The Data Masker 1206 has log type specific processing pipelines which replace PII data in the log entries with hash code or mask them, among other functions it performs, before loading them to the Log Reservoir 1208.

In some embodiments, a data center may have one or more security zones. All log files generated in a security zone may be archived in a log archive 1204 (e.g., Regional Data Hub) via a Data Hoarder. The Data Masker 1206 can masks PII and sensitive data and send the masked log files to a Log Reservoir 1208 (e.g., a Central Hub). A Data Masker 1206 can send the masked log files to a Log Reservoir 1204 by reading the log files from the archive and masking them.

Applications running inside a container can generate log and metric streams (into a set of log files). Some log files, for real-time monitoring, are processed by real-time stream collectors such as Logstash Forwarders (for ELK stack) or Heka configured to call a local Anomaly Resolver. The ELK stack uses the Logstash processing and filtering node and then forwards the data to Elasticsearch clusters for indexing. Kibana can be used for web-based search UI and rendering on top of Elasticsearch. There may be one or more real-time monitoring systems. Each Logstash Forwarder can forward the log to only one such system. If Kafka is used, Heka will publish anomalies to one topic or queue only.

In some embodiments, log files are pushed to the Data Hoarder using HTTPS and stored in the data center or zone specific Archives (ZFS for OCLA for now and Hadoop for Regional Hub). Map-Reduce Java and R programs are used to analyze these log files programmatically. Some log files for a particular time interval are loaded into Oracle Database and the Oracle Data Warehouse and Business Intelligence tools are used to support manual analysis. The Central Hub (Reservoir 1204) can also be used for trend computation and predictive analytics. The ELK and Solr+Banana stacks are also supported for the Archives and Data Hub (Reservoir).

LRAS 326 can uses the CCMS 324 component model to understand the relationships amongst logs and metrics streams generated by application and system components with respect to processing flows for services offered by the system. LRAS 326 can use an algorithm (e.g., attribute association algorithm) to find the indicator metrics that are likely affecting the user-defined metrics. Uses the normal system behavior defined by user-defined anomalies to compute the trends and seasonal variations expected on the indicator metrics such as key performance indicators (KPI) and statistics on log entries (e.g., average number of exceptions of a certain kind should not exceed a certain number in a certain time frame) that are defined for system-inferred anomalies. LRAS 326 can use machine learning techniques to detect undefined anomalies, those that are not defined by bounds on KPI or log statistics. LRAS 326 can predicts future anomalies.

Metric and log streams are analyzed offline to infer seasonal bounds for system-defined anomalies and discover undefined anomalies. For example, the system administrator might want to monitor the number of threads running in a container and raise an anomaly event if it exceeds the normal values. The system administrator does not have to specify the bounds (min, max, and max SL) for this metric. The seasonal variation of the values can be computed by LRAS 326 from the metric and log streams and sent to the container as a 24×7×3 table that contains the min, max, and max SL for the week broken down by the hour. The ADNS component running in the container can monitor the number of threads for anomaly detection using this information.

The time series data in the log and metric files are first divided into the following four categories: metrics associated with user-defined anomalies, metrics associated with system-inferred anomalies, metrics deemed important generally, and errors. The series in each category are then decomposed into trends and seasonal factors for either regular or irregular sampling intervals using R programs. These are then compared to time series metrics related to the user-defined anomalies to understand the causes of anomalies and to infer seasonal bounds on other metrics and errors to avoid these anomalies. These seasonal bounds are the fed back to the respective Containers to be used in real time monitoring of the system.

When analyzing the time series data to compute seasonal bounds for system-inferred anomalies and other metrics, LRAS 326 can focus on time intervals in which user-defined anomalies for a service go from normal to abnormal or vice versa, and focus on the metric values and log entries in that interval in related log files in immediate predecessor and successor components of the service to compute the seasonal bounds.

Container specific trends and seasonality computed from the archived data is fed into the container. This data is used by a Heka filter to test if any metric is outside the bound of normalcy based on the trend and seasonality. Upon determining that a metric value is an anomaly does the Heka daemon running in each container calls the event dispatcher of the ADRC in the container. If the event dispatcher cannot find the appropriate policy to resolve the anomaly it will inform the parent container to resolve the anomaly. If the parent container cannot resolve the anomaly it will publish the entire vector of metrics to the Kafka topic. Samza may be used to retrieves them and stores them in a data store (e.g., RRD) for further analysis by the anomaly detection code.

X. Processes for Anomaly Detection and Resolution

Figure 13:
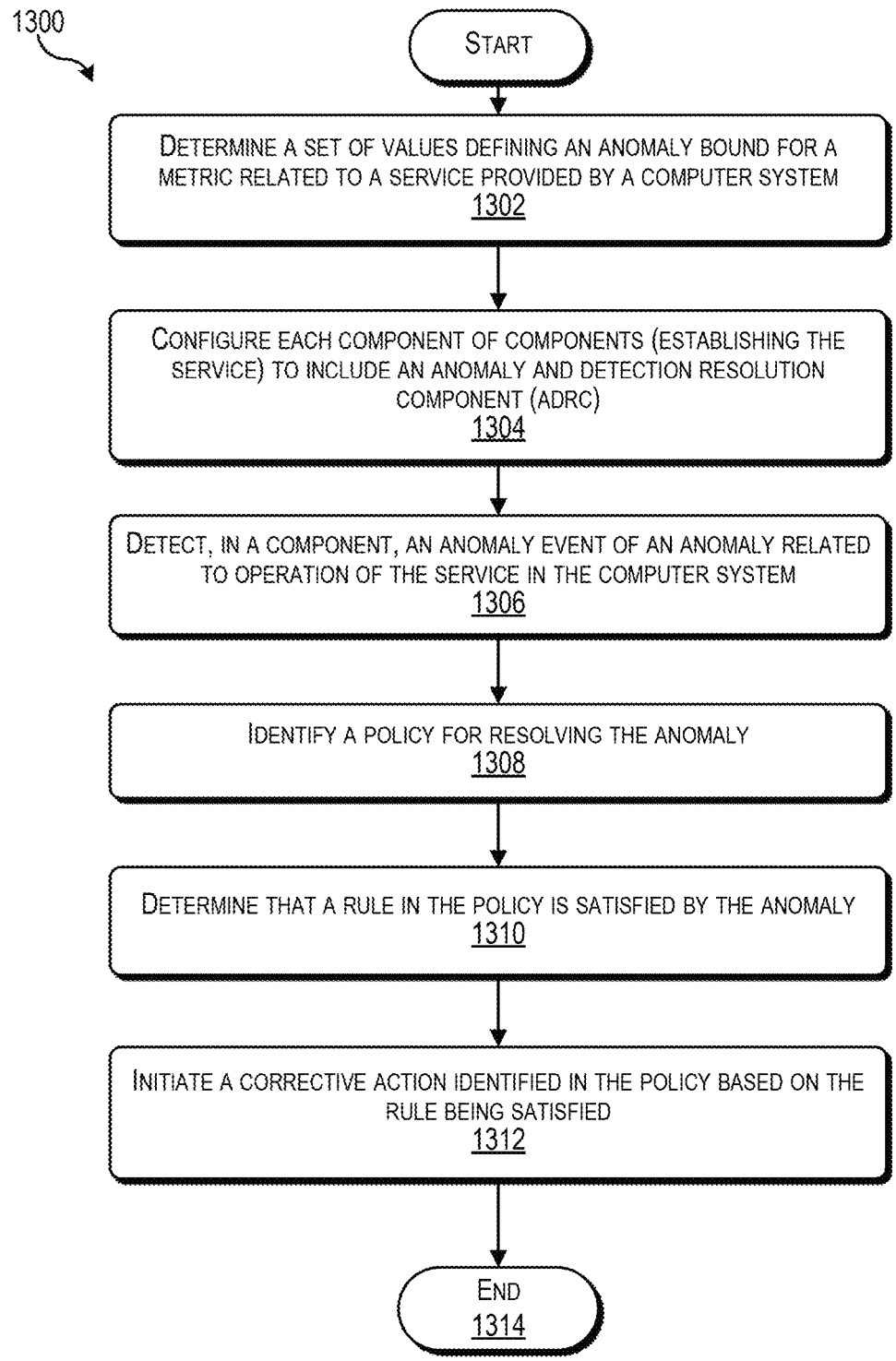
FIGS. 13 and 14 illustrate flowcharts of processes for anomaly detection and resolution according to some embodiments.
Figure 14:
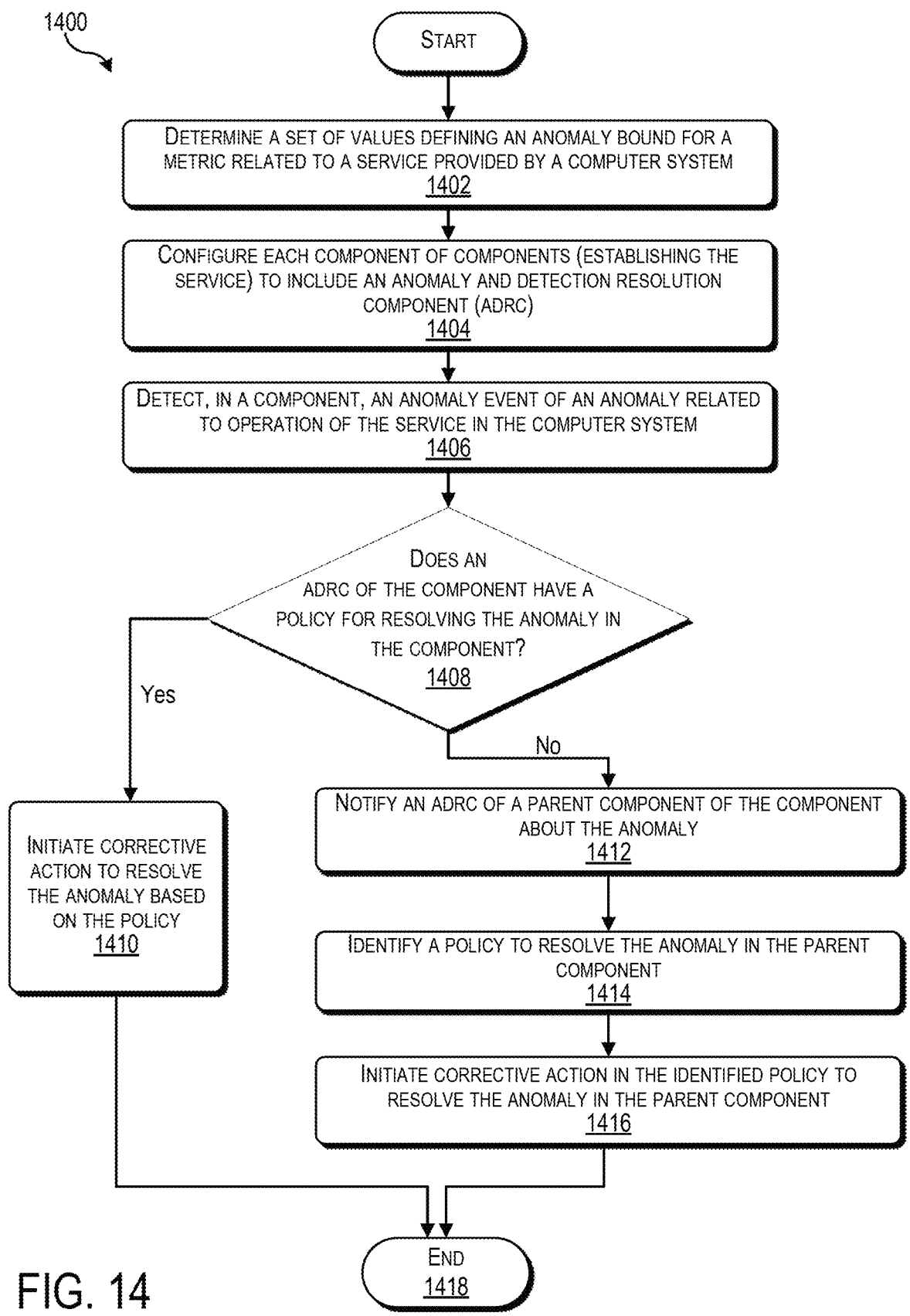

FIGS. 13 and 14 provide flowcharts illustrating processes for anomaly detection and resolution according to some embodiments of the present invention. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted in FIGS. 13 and 14 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). For example, all or a portion of ASC 318 of FIG. 3 and/or one or more ADRCs can implement the processes described with reference to any of FIGS. 13 and 14. Any of the processes may be implemented as a service. The service can be provided to client systems and service providers that provide access to objects.

The particular series of processing steps in FIGS. 13 and 14 is not intended to be limiting. Other sequences of steps may also be performed according to alternative embodiments. For example, alternative embodiments of the present invention may perform the steps outlined above in a different order. Moreover, the individual steps illustrated in FIGS. 13 and 14 may include multiple sub-steps that may be performed in various sequences as appropriate to the individual step. Furthermore, additional steps may be added or removed depending on the particular applications. While processing depicted in FIGS. 13 and 14 is with respect to a single application, such processing may be performed for several applications. While processing depicted in FIGS. 13 and 14 is with respect to a single anomaly event, such processing may be performed for several anomaly events, some or all of which may be related. One of ordinary skill in the art would recognize many variations, modifications, and alternatives.

In FIG. 13, flowchart illustrates a process 1300 for resolution of an anomaly related to operation of a service provided by a computer system. The computer system may be a cloud computer system (e.g., cloud infrastructure system 100) or an enterprise computer system. Multiple components may be deployed to provide the service. A component may be implemented within another component as a child component. Each component may be executing in the computer system. A component may be configured to include an ADRC for resolution of anomalies detected on the component.

Process 1300 may begin at step 1302 by determining a set of values defining an anomaly bound for a metric related to a service provided by a computer system. An ADRS implemented with the computer system may determine the anomaly bound. The set of values may be user defined. The values may be defined based on input received via an interface or a declarative file. The anomaly bound may be fixed for a user-defined anomaly or a seasonal bound for a system-inferred anomaly. The metric may be one of several metrics monitored for QoS for the service. An anomaly may be defined based on the anomaly classification system of FIGS. 9 and 10.

The service can be established by components in the computer system. The components may include containers executing in the computer system. A container may be implemented in another container as a child container. Each component may be configured to include an ADRC at step 1304. The ASC may configure the ADRC in each of the components.

At step 1306, an anomaly event related to operation of a service may be detected in a component established for the service. The anomaly event may be detected by the ADRC configured in the component. The anomaly event may be detected based on a value of the metric not satisfying the anomaly bound. For example, in FIG. 10, the value of metric may not satisfy an anomaly bound if it is a value 1010 that is less than the minimum 1002 or a value 1014 that is equal to or greater than the soft limit maximum. The anomaly event may be raised if the anomaly bound is satisfied during the polling interval and the occurrence of maximum continuous readings. An anomaly event may be detected based on satisfying all of the parameters of the anomaly defined using the anomaly classification system.

At step 1308, a policy for resolving the anomaly is identified. The policy may be identified by the ADRC in the component. A policy store may be searched to identify one or more policies having one or more rule(s) that are satisfied by the anomaly. At step 1310, a determination may be made that a rule in the policy is satisfied by the anomaly. The determination may be made by the ADRC in the component. A policy may indicate one or more corrective actions for resolving the anomaly in the component in which the anomaly event is detected. At step 1312, a corrective action identified in the policy may be initiated based on the rule being satisfied.

In some embodiments, a policy for resolving the anomaly in the component may not be identified. In such a case, the ADRC of the component may communicate the anomaly event to a parent component (if one exists) that includes the component. In some embodiments, such as the embodiment described with reference to FIG. 14, a parent component may resolve the anomaly by identifying a policy for resolving the anomaly.

Process 1300 ends at step 1314.

FIG. 14 illustrates a flowchart of a process 1400 for propagating an anomaly to components in a hierarchy of components established for a service in a computer system. Process 1400 may begin at step 1402 by determining a set of values defining an anomaly bound for a metric related to a service provided by a computer system. An ADRS implemented with the computer system may determine the anomaly bound. The set of values may be user defined. The values may be defined based on input received via an interface or a declarative file. The anomaly bound may be fixed for a user-defined anomaly or a seasonal bound for a system-inferred anomaly. The metric may be one of several metrics monitored for QoS for the service. An anomaly may be defined based on the anomaly classification system of FIGS. 9 and 10.

The service can be established by components in the computer system. The components may include containers executing in the computer system. A container may be implemented in another container as a child container. Each component may be configured to include an ADRC at step 1404. The ASC may configure the ADRC in each of the components.

At step 1406, an anomaly event related to operation of a service may be detected in a component established for the service. The anomaly event may be detected by the ADRC configured in the component. The anomaly event may be detected based on a value of the metric not satisfying the anomaly bound. An anomaly event may be detected based on satisfying all of the parameters of the anomaly defined using the anomaly classification system.

At step 1408, a determination is made whether an ADRC in the component has a policy for resolving the anomaly in the component. At step 1410, based on determining that the ADRC in the component has a policy for resolving the anomaly, the ADRC may initiate a corrective action to resolve the anomaly based on the policy. At step 1412, based on determining that the ADRC in the component does not have a policy for resolving the anomaly, the ADRC may notify the ADRC of a parent component that is a parent of the component about the anomaly. The ADRC may notify the ADRC of the parent component that the anomaly cannot be resolved by the component. Process 1400 may process to end at step 1418 from step 1412.

At step 1414, the ADRC of the parent component may identify a policy for it to resolve the anomaly in the parent component. At step 1416, the ADRC of the parent component may initiate a corrective action identified in the policy for resolving the anomaly in the parent component. Process 1400 may proceed to end at step 1418 from step 1416.

In some embodiments, the ADRC of the parent component may not have a policy for resolving the anomaly in the parent component. The parent component may propagate data about the anomaly event to higher level components, such as a parent component of the parent component. The ADRC of the parent component may notify its parent component about the anomaly. The ADRC of the higher level parent component may initiate corrective action to resolve the anomaly provided that the ADRC can identify a policy for resolving the anomaly in the higher level parent component.

XI. Computing Environments

Figure 15:
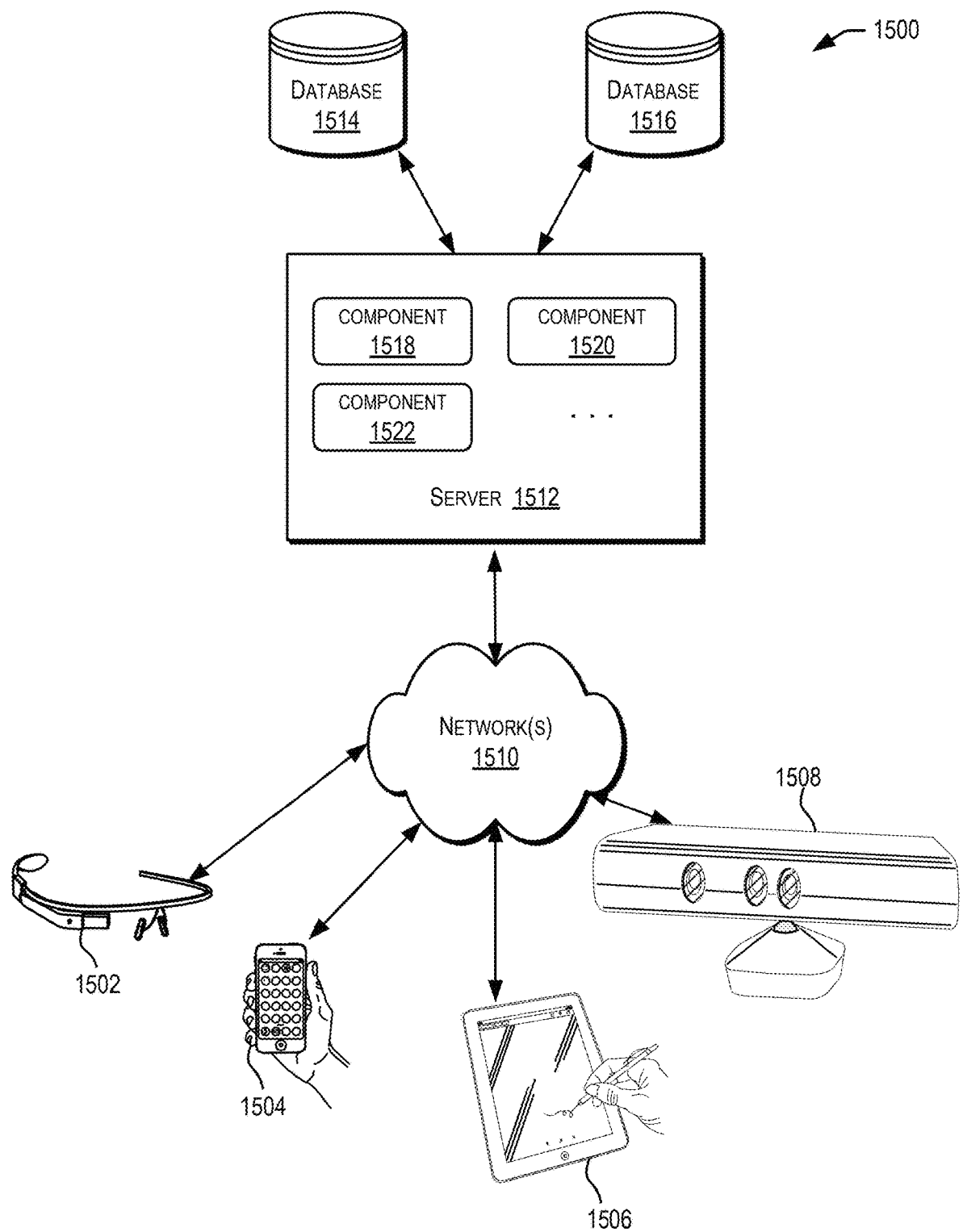
FIG. 15 depicts a simplified diagram of a distributed system for implementing an embodiment.

FIG. 15 depicts a simplified diagram of a distributed system 1500 for implementing an embodiment. In the illustrated embodiment, distributed system 1500 includes one or more client computing devices 1502, 1504, 1506, and 1508, which are configured to execute and operate a client application such as a web browser, proprietary client (e.g., Oracle Forms), or the like over one or more network(s) 1510. Server 1512 may be communicatively coupled with remote client computing devices 1502, 1504, 1506, and 1508 via network 1510.

In various embodiments, server 1512 may be adapted to run one or more services or software applications such as services and applications that may manage security artifacts. In certain embodiments, server 1512 may also provide other services or software applications can include non-virtual and virtual environments. In some embodiments, these services may be offered as web-based or cloud services or under a Software as a Service (SaaS) model to the users of client computing devices 1502, 1504, 1506, and/or 1508. Users operating client computing devices 1502, 1504, 1506, and/or 1508 may in turn utilize one or more client applications to interact with server 1512 to utilize the services provided by these components.

In the configuration depicted in FIG. 15, software components 1518, 1520 and 1522 of system 1500 are shown as being implemented on server 1512. In other embodiments, one or more of the components of system 1500 and/or the services provided by these components may also be implemented by one or more of the client computing devices 1502, 1504, 1506, and/or 1508. Users operating the client computing devices may then utilize one or more client applications to use the services provided by these components. These components may be implemented in hardware, firmware, software, or combinations thereof. It should be appreciated that various different system configurations are possible, which may be different from distributed system 1500. The embodiment shown in FIG. 15 is thus one example of a distributed system for implementing an embodiment system and is not intended to be limiting.

Client computing devices 1502, 1504, 1506, and/or 1508 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 1510.

Although distributed system 1500 in FIG. 15 is shown with four client computing devices, any number of client computing devices may be supported. Other devices, such as devices with sensors, etc., may interact with server 1512.

Network(s) 1510 in distributed system 1500 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 1510 can be a local area network (LAN), networks based on Ethernet, Token-Ring, a wide-area network, the Internet, a virtual network, a virtual private network (VPN), an intranet, an extranet, a public switched telephone network (PSTN), an infrared network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 1512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1512 can include one or more virtual machines running virtual operating systems, or other computing architectures involving virtualization. One or more flexible pools of logical storage devices can be virtualized to maintain virtual storage devices for the server. Virtual networks can be controlled by server 1512 using software defined networking. In various embodiments, server 1512 may be adapted to run one or more services or software applications described in the foregoing disclosure. For example, server 1512 may correspond to a server for performing processing as described above according to an embodiment of the present disclosure.

Server 1512 may run an operating system including any of those discussed above, as well as any commercially available server operating system. Server 1512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1512 may include one or more applications to analyze and consolidate data feeds and/or event updates received from users of client computing devices 1502, 1504, 1506, and 1508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1512 may also include one or more applications to display the data feeds and/or real-time events via one or more display devices of client computing devices 1502, 1504, 1506, and 1508.

Distributed system 1500 may also include one or more databases 1514 and 1516. These databases may provide a mechanism for storing information such as user interactions information, usage patterns information, adaptation rules information, and other information used by embodiments of the present invention. Databases 1514 and 1516 may reside in a variety of locations. By way of example, one or more of databases 1514 and 1516 may reside on a non-transitory storage medium local to (and/or resident in) server 1512. Alternatively, databases 1514 and 1516 may be remote from server 1512 and in communication with server 1512 via a network-based or dedicated connection. In one set of embodiments, databases 1514 and 1516 may reside in a storage-area network (SAN). Similarly, any necessary files for performing the functions attributed to server 1512 may be stored locally on server 1512 and/or remotely, as appropriate. In one set of embodiments, databases 1514 and 1516 may include relational databases, such as databases provided by Oracle that are adapted to store, update, and retrieve data in response to SQL-formatted commands.

Figure 16:
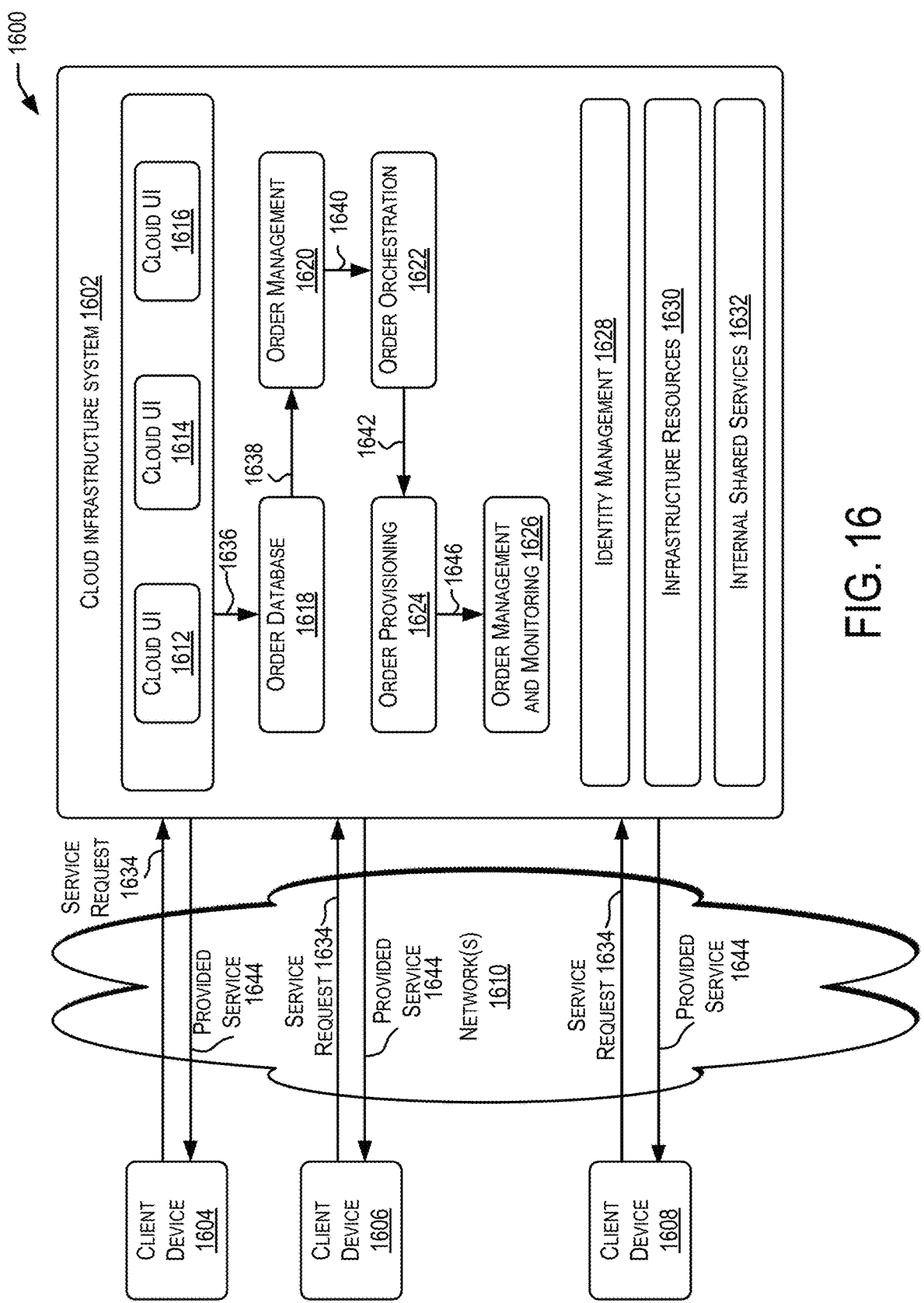
FIG. 16 illustrates a simplified block diagram of one or more components of a system environment in which services may be offered as cloud services, in accordance with an embodiment of the present disclosure.

In some embodiments, a cloud environment may provide one or more services for managing security artifacts. FIG. 16 is a simplified block diagram of one or more components of a system environment 1600 in which services may be offered as cloud services, in accordance with an embodiment of the present disclosure. In the illustrated embodiment in FIG. 16, system environment 1600 includes one or more client computing devices 1604, 1606, and 1608 that may be used by users to interact with a cloud infrastructure system 1602 that provides cloud services, including services for managing security artifacts. Cloud infrastructure system 1602 may comprise one or more computers and/or servers that may include those described above for server 1512.

It should be appreciated that cloud infrastructure system 1602 depicted in FIG. 16 may have other components than those depicted. Further, the embodiment shown in FIG. 16 is only one example of a cloud infrastructure system that may incorporate an embodiment of the invention. In some other embodiments, cloud infrastructure system 1602 may have more or fewer components than shown in the figure, may combine two or more components, or may have a different configuration or arrangement of components.

Client computing devices 1604, 1606, and 1608 may be devices similar to those described above for client computing devices 1502, 1504, 1506, and 1508. Client computing devices 1604, 1606, and 1608 may be configured to operate a client application such as a web browser, a proprietary client application (e.g., Oracle Forms), or some other application, which may be used by a user of the client computing device to interact with cloud infrastructure system 1602 to use services provided by cloud infrastructure system 1602. Although exemplary system environment 1600 is shown with three client computing devices, any number of client computing devices may be supported. Other devices such as devices with sensors, etc. may interact with cloud infrastructure system 1602.

Network(s) 1610 may facilitate communications and exchange of data between client computing devices 1604, 1606, and 1608 and cloud infrastructure system 1602. Each network may be any type of network familiar to those skilled in the art that can support data communications using any of a variety of commercially-available protocols, including those described above for network(s) 1510.

In certain embodiments, services provided by cloud infrastructure system 1602 may include a host of services that are made available to users of the cloud infrastructure system on demand. In addition to services related to managing security artifacts, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1602 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1602 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1602 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1602 may be adapted to automatically provision, manage and track a customer's subscription to services offered by cloud infrastructure system 1602. Cloud infrastructure system 1602 may provide the cloud services via different deployment models. For example, services may be provided under a public cloud model in which cloud infrastructure system 1602 is owned by an organization selling cloud services (e.g., owned by Oracle Corporation) and the services are made available to the general public or different industry enterprises. As another example, services may be provided under a private cloud model in which cloud infrastructure system 1602 is operated solely for a single organization and may provide services for one or more entities within the organization. The cloud services may also be provided under a community cloud model in which cloud infrastructure system 1602 and the services provided by cloud infrastructure system 1602 are shared by several organizations in a related community. The cloud services may also be provided under a hybrid cloud model, which is a combination of two or more different models.

In some embodiments, the services provided by cloud infrastructure system 1602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1602. Cloud infrastructure system 1602 then performs processing to provide the services in the customer's subscription order.

In some embodiments, the services provided by cloud infrastructure system 1602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1602 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1602 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1602 may also include infrastructure resources 1630 for providing the resources used to provide various services to customers of the cloud infrastructure system. In one embodiment, infrastructure resources 1630 may include pre-integrated and optimized combinations of hardware, such as servers, storage, and networking resources to execute the services provided by the PaaS platform and the SaaS platform, and other resources.

In some embodiments, resources in cloud infrastructure system 1602 may be shared by multiple users and dynamically re-allocated per demand. Additionally, resources may be allocated to users in different time zones. For example, cloud infrastructure system 1602 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1632 may be provided that are shared by different components or modules of cloud infrastructure system 1602 to enable provision of services by cloud infrastructure system 1602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1602, and the like.

In one embodiment, as depicted in FIG. 16, cloud management functionality may be provided by one or more modules, such as an order management module 1620, an order orchestration module 1622, an order provisioning module 1624, an order management and monitoring module 1626, and an identity management module 1628. These modules may include or be provided using one or more computers and/or servers, which may be general purpose computers, specialized server computers, server farms, server clusters, or any other appropriate arrangement and/or combination.

In an exemplary operation, at step 1634, a customer using a client device, such as client computing devices 1604, 1606 or 1608, may interact with cloud infrastructure system 1602 by requesting one or more services provided by cloud infrastructure system 1602 and placing an order for a subscription for one or more services offered by cloud infrastructure system 1602. In certain embodiments, the customer may access a cloud User Interface (UI) such as cloud UI 1612, cloud UI 1614 and/or cloud UI 1616 and place a subscription order via these UIs. The order information received by cloud infrastructure system 1602 in response to the customer placing an order may include information identifying the customer and one or more services offered by the cloud infrastructure system 1602 that the customer intends to subscribe to.

At step 1636, the order information received from the customer may be stored in an order database 1618. If this is a new order, a new record may be created for the order. In one embodiment, order database 1618 can be one of several databases operated by cloud infrastructure system 1618 and operated in conjunction with other system elements.

At step 1638, the order information may be forwarded to an order management module 1620 that may be configured to perform billing and accounting functions related to the order, such as verifying the order, and upon verification, booking the order.

At step 1640, information regarding the order may be communicated to an order orchestration module 1622 that is configured to orchestrate the provisioning of services and resources for the order placed by the customer. In some instances, order orchestration module 1622 may use the services of order provisioning module 1624 for the provisioning. In certain embodiments, order orchestration module 1622 enables the management of business processes associated with each order and applies business logic to determine whether an order should proceed to provisioning.

As shown in the embodiment depicted in FIG. 16, at step 1642, upon receiving an order for a new subscription, order orchestration module 1622 sends a request to order provisioning module 1624 to allocate resources and configure resources needed to fulfill the subscription order. Order provisioning module 1624 enables the allocation of resources for the services ordered by the customer. Order provisioning module 1624 provides a level of abstraction between the cloud services provided by cloud infrastructure system 1600 and the physical implementation layer that is used to provision the resources for providing the requested services. This enables order orchestration module 1622 to be isolated from implementation details, such as whether or not services and resources are actually provisioned on the fly or pre-provisioned and only allocated/assigned upon request.

At step 1644, once the services and resources are provisioned, a notification may be sent to the subscribing customers indicating that the requested service is now ready for use. In some instance, information (e.g. a link) may be sent to the customer that enables the customer to start using the requested services.

At step 1646, a customer's subscription order may be managed and tracked by an order management and monitoring module 1626. In some instances, order management and monitoring module 1626 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 1600 may include an identity management module 1628 that is configured to provide identity services, such as access management and authorization services in cloud infrastructure system 1600. In some embodiments, identity management module 1628 may control information about customers who wish to utilize the services provided by cloud infrastructure system 1602. Such information can include information that authenticates the identities of such customers and information that describes which actions those customers are authorized to perform relative to various system resources (e.g., files, directories, applications, communication ports, memory segments, etc.). Identity management module 1628 may also include the management of descriptive information about each customer and about how and by whom that descriptive information can be accessed and modified.

Figure 17:
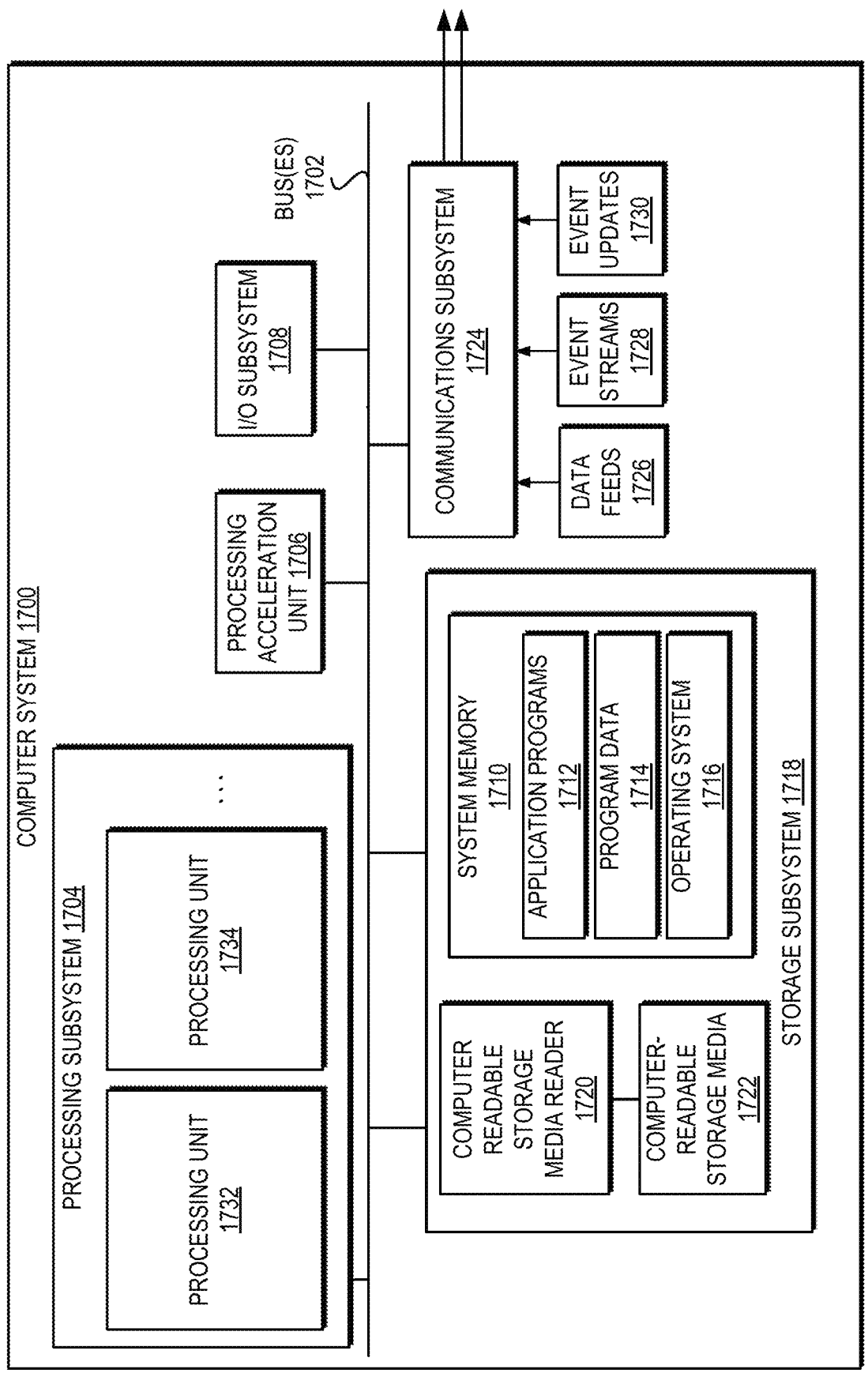
FIG. 17 illustrates an exemplary computer system that may be used to implement an embodiment of the present invention.

FIG. 17 illustrates an exemplary computer system 1700 that may be used to implement an embodiment of the present invention. In some embodiments, computer system 1700 may be used to implement any of the various servers and computer systems described above. As shown in FIG. 17, computer system 1700 includes various subsystems including a processing unit 1704 that communicates with a number of peripheral subsystems via a bus subsystem 1702. These peripheral subsystems may include a processing acceleration unit 1706, an I/O subsystem 1708, a storage subsystem 1718 and a communications subsystem 1724. Storage subsystem 1718 may include tangible computer-readable storage media 1722 and a system memory 1710.

Bus subsystem 1702 provides a mechanism for letting the various components and subsystems of computer system 1700 communicate with each other as intended. Although bus subsystem 1702 is shown schematically as a single bus, alternative embodiments of the bus subsystem may utilize multiple buses. Bus subsystem 1702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1704 controls the operation of computer system 1700 and may comprise one or more processing units 1732, 1734, etc. A processing unit may include be one or more processors, including single core or multicore processors, one or more cores of processors, or combinations thereof. In some embodiments, processing subsystem 1704 can include one or more special purpose co-processors such as graphics processors, digital signal processors (DSPs), or the like. In some embodiments, some or all of the processing units of processing subsystem 1704 can be implemented using customized circuits, such as application specific integrated circuits (ASICs), or field programmable gate arrays (FPGAs).

In some embodiments, the processing units in processing subsystem 1704 can execute instructions stored in system memory 1710 or on computer readable storage media 1722. In various embodiments, the processing units can execute a variety of programs or code instructions and can maintain multiple concurrently executing programs or processes. At any given time, some or all of the program code to be executed can be resident in system memory 1710 and/or on computer-readable storage media 1722 including potentially on one or more storage devices. Through suitable programming, processing subsystem 1704 can provide various functionalities described above for managing security artifacts.

In certain embodiments, a processing acceleration unit 1706 may be provided for performing customized processing or for off-loading some of the processing performed by processing subsystem 1704 so as to accelerate the overall processing performed by computer system 1700.

I/O subsystem 1708 may include devices and mechanisms for inputting information to computer system 1700 and/or for outputting information from or via computer system 1700. In general, use of the term "input device" is intended to include all possible types of devices and mechanisms for inputting information to computer system 1700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1718 provides a repository or data store for storing information that is used by computer system 1700. Storage subsystem 1718 provides a tangible non-transitory computer-readable storage medium for storing the basic programming and data constructs that provide the functionality of some embodiments. Software (programs, code modules, instructions) that when executed by processing subsystem 1704 provide the functionality described above may be stored in storage subsystem 1718. The software may be executed by one or more processing units of processing subsystem 1704. Storage subsystem 1718 may also provide a repository for storing data used in accordance with the present invention.

Storage subsystem 1718 may include one or more non-transitory memory devices, including volatile and non-volatile memory devices. As shown in FIG. 17, storage subsystem 1718 includes a system memory 1710 and a computer-readable storage media 1722. System memory 1710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1700, such as during start-up, may typically be stored in the ROM. The RAM typically contains data and/or program modules that are presently being operated and executed by processing subsystem 1704. In some implementations, system memory 1710 may include multiple different types of memory, such as static random access memory (SRAM) or dynamic random access memory (DRAM).

By way of example, and not limitation, as depicted in FIG. 17, system memory 1710 may store application programs 1712, which may include client applications, Web browsers, mid-tier applications, relational database management systems (RDBMS), etc., program data 1714, and an operating system 1716. By way of example, operating system 1716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1722 may store programming and data constructs that provide the functionality of some embodiments. Software (programs, code modules, instructions) that when executed by processing subsystem 1704 a processor provide the functionality described above may be stored in storage subsystem 1718. By way of example, computer-readable storage media 1722 may include non-volatile memory such as a hard disk drive, a magnetic disk drive, an optical disk drive such as a CD ROM, DVD, a Blu-Ray® disk, or other optical media. Computer-readable storage media 1722 may include, but is not limited to, Zip® drives, flash memory cards, universal serial bus (USB) flash drives, secure digital (SD) cards, DVD disks, digital video tape, and the like. Computer-readable storage media 1722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1722 may provide storage of computer-readable instructions, data structures, program modules, and other data for computer system 1700.

In certain embodiments, storage subsystem 1700 may also include a computer-readable storage media reader 1720 that can further be connected to computer-readable storage media 1722. Together and, optionally, in combination with system memory 1710, computer-readable storage media 1722 may comprehensively represent remote, local, fixed, and/or removable storage devices plus storage media for storing computer-readable information.

In certain embodiments, computer system 1700 may provide support for executing one or more virtual machines. Computer system 1700 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1700. Accordingly, multiple operating systems may potentially be run concurrently by computer system 1700. Each virtual machine generally runs independently of the other virtual machines.

Communications subsystem 1724 provides an interface to other computer systems and networks. Communications subsystem 1724 serves as an interface for receiving data from and transmitting data to other systems from computer system 1700. For example, communications subsystem 1724 may enable computer system 1700 to establish a communication channel to one or more client computing devices via the Internet for receiving and sending information from and to the client computing devices.

Communication subsystem 1724 may support both wired and/or wireless communication protocols. For example, in certain embodiments, communications subsystem 1724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1724 can provide wired network connectivity (e.g., Ethernet) in addition to or instead of a wireless interface.

Communication subsystem 1724 can receive and transmit data in various forms. For example, in some embodiments, communications subsystem 1724 may receive input communication in the form of structured and/or unstructured data feeds 1726, event streams 1728, event updates 1730, and the like. For example, communications subsystem 1724 may be configured to receive (or send) data feeds 1726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1724 may be configured to receive data in the form of continuous data streams, which may include event streams 1728 of real-time events and/or event updates 1730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1724 may also be configured to output the structured and/or unstructured data feeds 1726, event streams 1728, event updates 1730, and the like to one or more databases that may be in communication with one or more streaming data source computers coupled to computer system 1700.

Computer system 1700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1700 depicted in FIG. 17 is intended only as a specific example. Many other configurations having more or fewer components than the system depicted in FIG. 17 are possible. Based on the disclosure and teachings provided herein, a person of ordinary skill in the art will appreciate other ways and/or methods to implement the various embodiments.

Figure 18:
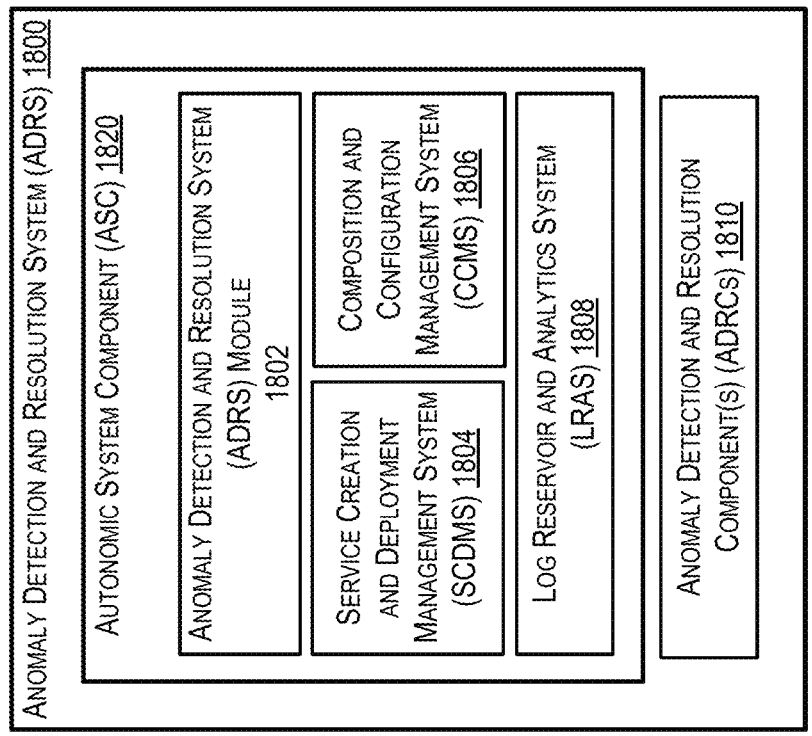
FIG. 18 illustrates an ADRS that may be used to implement an embodiment of the present invention.

FIG. 18 illustrates an exemplary anomaly detection and resolution system (ADRS) 1800 that may be used to implement an embodiment of the present invention. As shown in FIG. 18, the ADRS 1800 may include an ASC 1820. ASC 1820 may include an ADRS 1802 module, an SCDMS 1804, a CCMS 1806, and an LRAS 1808. ADRS 1800 may include one or more ADRCs 1810. The ADRCs 1810 may be implemented as part of the ADRS 1800. ASC 1820 may be ASC 318 of FIG. 13. SCDMS 1804 may be 322, CCMS 1806 may be CCMS 324, LRAS 1808 may be LRAS 326, and ADRS 1802 module may be ADRS 320. ADRCs 1810 may be ADRCs 354, 364, 374 of FIG. 3.

In at least one embodiment, ADRS module 1802 may be configured to determine a set of values defining an anomaly bound for a metric related to a service provided by a cloud computer system. The service may be established by components in the cloud computer system. The components may include a first container and a second container executing in the cloud computer environment. The first container may be a child container in the second container. ADRS module 1802 may be configured to configure the first container to include an anomaly detection and resolution component (ADRC), such as one of ADRCs 1810. An ADRC may be configured to detect, in the first container, an anomaly event of an anomaly related to operation of the service in the cloud computer system. The anomaly event may be detected based on a value of the metric not satisfying the anomaly bound for the metric. The ADRC may be configured to identify a policy for resolving the anomaly in the first container. The ADRC may be configured to determine that a rule in the policy is satisfied by the anomaly. The ADRC may be configured to initiate a corrective action to resolve the anomaly. The corrective action may be identified in the policy based on the rule being satisfied.

In some embodiments, the anomaly bound is a fixed bound defined for a user-defined anomaly. The set of values may include a polling interval value, a minimum measure of the metric, a soft limit for the metric, a maximum for the metric, and a minimum consecutive readings value defining a minimum number of occurrences of the anomaly. Detecting the anomaly event may include determining whether the value of the metric satisfies the anomaly bound. The value of the metric may not satisfy the anomaly bound when the value is less than the minimum measure and equal to or greater than the soft limit. The anomaly event may be detected based on the minimum consecutive readings being satisfied.

In some embodiments, the anomaly bound is a seasonal bound defined for a user-defined anomaly. The set of values may include a polling interval value, a minimum measure of the metric, a soft limit for the metric, a maximum for the metric, a duration of consecutive occurrences of the anomaly, a start time when the seasonal bound is valid, and an end time when the seasonal bound is valid. Detecting the anomaly event may include determining whether the value of the metric satisfies the anomaly bound. The value of the metric may not satisfy the anomaly bound when the value is less than the minimum measure and equal to or greater than the soft limit, when the anomaly event is detected for the duration and is detected after the start time and before the end time.

In at least one embodiment, determining the set of values includes analyzing time series data of log files to compute the set of values for the anomaly bound.

In some embodiments, the ADRC may be configured to, upon determining that a policy for resolving the anomaly in the first container cannot be identified, notify, the second container, that the anomaly cannot be resolved in the first container. The ADRC may be configured to identify a policy for resolving the anomaly in the second container. The method may include determining that a rule, in the policy for resolving the anomaly in the second container, is satisfied by the anomaly. The ADRC may be configured to, based on the rule being satisfied, initiating a corrective action identified in the policy for resolving the anomaly in the second container.

In at least one embodiment, the metric related to the service is one of a plurality of metrics monitored for quality of service (QoS) for providing the service.

In at least one embodiment, ADRS module 1802 may be configured to determine a set of values defining an anomaly bound for a metric related to a service provided by a cloud computer system. The service may be established by components in the cloud computer system. The components may include a first container and a second container executing in the cloud computer environment. The first container may be a child container in the second container. ADRS module 1802 may be configured to configure the first container to include a first anomaly detection and resolution component (ADRC), such as one of ADRCs 1810. ADRS module 1802 may be configured to configure the second container to include a second ADRC. The first ADRC may be configured to detect, in the first container, an anomaly event of an anomaly related to operation of the service in the cloud computer system. The anomaly event is detected based on a value of the metric not satisfying the anomaly bound for the metric. The first ADRC may be configured to determine whether the first ADRC has a policy for resolving the anomaly in the first container. The first ADRC may be configured to, based on determining that the first ADRC does not have a policy for resolving the anomaly in the first container, notifying, the second container, that the anomaly cannot be resolved in the first container. The second ADRC may be configured to identify a policy for the ADRC to resolve the anomaly in the second container. The second ADRC may be configured to determine that a rule, in the policy for resolving the anomaly in the second container, is satisfied by the anomaly. The second ADRC may be configured to, based on the rule being satisfied, initiate a corrective action identified in the policy for resolving the anomaly in the second container.

In some embodiments, the second ADRC may be configured to, based on determining, that the second ADRC does not have a policy to resolve the anomaly in the second container, sending, using a communication system, an alert that the anomaly could not be resolved.

In some embodiments, the second ADRC may be configured to, based on determining, that the second ADRC does not have a policy to resolve the anomaly in the second container, notify, a third container, that the anomaly cannot be resolved, wherein the third container is one of the components. The third container may include the second container. A third ADRC may be configured in the third container to identify a policy to resolve the anomaly in the third container. The third ADRC may be configured to initiate corrective action identified in the policy for resolving the anomaly in the third container.

Although specific embodiments of the invention have been described, various modifications, alterations, alternative constructions, and equivalents are also encompassed within the scope of the invention. The modifications include any relevant combination of the disclosed features. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
    providing, by a computer system, a service using a plurality of components, the plurality of components including a first component and a second component, wherein the first component runs a thread or process using resources that are available to the second component;
    providing, by the computer system, a first anomaly detection and resolution component (ADRC) for detecting one or more anomaly events for the first component;
    providing, by the computer system, a second ADRC for detecting one or more anomaly events for the second component;
    detecting, by the first ADRC, an anomaly event based on determining that a metric related to the provided service satisfies a set of one or more measures that have been defined for the provided service; and
    responsive to the detecting of the anomaly event:
        determining, by the first ADRC, that the first ADRC does not have a policy for resolving the anomaly event;
        notifying the second component that the anomaly event cannot be resolved by the first component;
        identifying, by the second ADRC, a first policy for handling the anomaly event, the first policy comprising a set of one or more rules;
        determining, by the second ADRC, a corrective action based on satisfaction of a rule from the set of one or more rules by the anomaly event; and
        initiating, by the second ADRC, the corrective action.

2. The method of claim 1, further comprising:
    identifying, by the second ADRC, that the rule from the set of one or more rules is satisfied by the anomaly event, wherein the first policy is provided for use by the second ADRC.

3. The method of claim 1, wherein the second component is a container that provides, for use by the first component, at least one of a namespace or a resource pool.

4. The method of claim 1, wherein the set of one or more measures includes a first limit and a second limit, and wherein determining whether the metric satisfies the set of one or more measures comprises determining that a value of the metric is outside a range defined by the first limit and the second limit.

5. The method of claim 4, wherein the detecting the anomaly event comprises determining a number of occurrences of when the value of the metric is outside the range, and wherein detecting the anomaly event further comprises determining that the number of occurrences is greater than a minimum threshold.

6. The method of claim 5, wherein detecting the anomaly event comprises determining a number of occurrences within a time period of when the value of the metric is outside the range.

7. The method of claim 1, wherein the second component is a virtual machine (VM), and wherein the first component is a Java VM.

8. The method of claim 1, wherein the provided service is one of a plurality of services provided by the computer system to one or more users, and wherein the provided service is made available to the one or more users on a subscription basis.

9. The method of claim 1, wherein detecting the anomaly event comprises determining that a time associated with the anomaly event is within a range defined by a seasonal start time and a seasonal end time, and wherein the seasonal start time and the seasonal end time define a seasonal time period for when the set of one or more measures is valid.

10. The method of claim 1, wherein the set of one or more measures is determined based on analyzing time series data of log files associated with providing the service.

11. A computer system comprising:
one or more processors; and
a memory accessible by the one or more processors, the memory storing instructions which, upon execution by the one or more processors, cause the one or more processors to:
provide a service using a plurality of components, the plurality of components including a first component and a second component, wherein the first component runs a thread or process using resources that are available to the second component;
provide a first anomaly detection and resolution component (ADRC) for detecting one or more anomaly events for the first component;
provide a second ADRC for detecting one or more anomaly events for the second component;
detect, using the first ADRC, an anomaly event based on determining that a metric related to the provided service satisfies a set of one or more measures that have been defined for the provided service; and
responsive to the detecting of the anomaly event:
determine, using the first ADRC, that the first ADRC does not have a policy for resolving the anomaly event;
notify the second component that the anomaly event cannot be resolved by the first component;
identify, using the second ADRC, a first policy for handling the anomaly event, the first policy comprising a set of one or more rules;
determine, using the second ADRC, a corrective action based on satisfaction of a rule from the set of one or more rules by the anomaly event; and
initiate, using the second ADRC, the corrective action.

12. The computer system of claim 11, wherein the instructions further cause the one or more processors to identify, using the second ADRC, that the rule from the set of one or more rules is satisfied by the anomaly event, wherein the first policy is provided for use by the second ADRC.

13. The computer system of claim 11, wherein the second component is a container that provides, for use by the first component, at least one of a namespace or a resource pool.

14. The computer system of claim 11, wherein the set of one or more measures includes a first limit and a second limit, and wherein determining whether the metric satisfies the set of one or more measures comprises determining that a value of the metric is outside a range defined by the first limit and the second limit.

15. The computer system of claim 14, wherein the detecting the anomaly event comprises determining a number of occurrences of when the value of the metric is outside the range, and wherein detecting the anomaly event further comprises determining that the number of occurrences is greater than a minimum threshold.

16. The computer system of claim 15, wherein detecting the anomaly event comprises determining a number of occurrences within a time period of when the value of the metric is outside the range.

17. The computer system of claim 11, wherein the second component is a virtual machine (VM), and wherein the first component is a Java VM.

18. The computer system of claim 11, wherein the provided service is one of a plurality of services provided by the computer system to one or more users, and wherein the provided service is made available to the one or more users on a subscription basis.

19. The computer system of claim 11, wherein detecting the anomaly event comprises determining that a time associated with the anomaly event is within a range defined by a seasonal start time and a seasonal end time, and wherein the seasonal start time and the seasonal end time define a seasonal time period for when the set of one or more measures are valid.

20. A computer-readable storage medium storing instructions which, upon execution by one or more processors of a computer system, cause the one or more processors to:
provide a service using a plurality of components, the plurality of components including a first component and a second component, wherein the first component runs a thread or process using resources that are available to the second component;
provide a first anomaly detection and resolution component (ADRC) for detecting one or more anomaly events for the first component;
provide a second ADRC for detecting one or more anomaly events for the second component;
detect, using the first ADRC, an anomaly event based on determining that a metric related to the provided service satisfies a set of one or more measures that have been defined for the provided service; and
responsive to the detecting of the anomaly event:
determine, using the first ADRC, that the first ADRC does not have a policy for resolving the anomaly event;
notify the second component that the anomaly event cannot be resolved by the first component;
identify, using the second ADRC, a first policy for handling the anomaly event, the first policy comprising a set of one or more rules;
determine, using the second ADRC, a corrective action based on satisfaction of a rule from the set of one or more rules by the anomaly event; and
initiate, using the second ADRC, the corrective action.

* * * * *

UNITED STATES PATENT AND TRADEMARK OFFICE
CERTIFICATE OF CORRECTION

PATENT NO.         : 10,853,161 B2                                        Page 1 of 1
APPLICATION NO.    : 16/050429
DATED              : December 1, 2020
INVENTOR(S)        : Ahad It is certified that error appears in the above-identified patent and that said Letters Patent is hereby corrected as shown below:

In the Specification

In Column 15, Line 18, delete "polic(ies)." and insert -- policy(ies). --, therefor.

In Column 17, Line 44, delete "orchestrator" and insert -- Orchestrator --, therefor.

In Column 18, Line 61, delete "(BD)," and insert -- (IID), --, therefor.

In Column 18, Line 62, delete "BD" and insert -- IID --, therefor.

In Column 18, Line 64, delete "BD" and insert -- IID --, therefor.

In Column 19, Line 7, delete "BD." and insert -- IID. --, therefor.

In Column 19, Line 18, delete "examAn" and insert -- example, an --, therefor.

In Column 25, Line 41, delete "Kafta" and insert -- Kafka --, therefor.

In Column 30, Line 14, delete "LARS" and insert -- LRAS --, therefor.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*